(12) United States Patent
Fahimi et al.

(10) Patent No.: US 8,442,698 B2
(45) Date of Patent: May 14, 2013

(54) METHODS AND APPARATUS FOR DESIGN AND CONTROL OF MULTI-PORT POWER ELECTRONIC INTERFACE FOR RENEWABLE ENERGY SOURCES

(75) Inventors: Babak Fahimi, Arlington, TX (US); Wei Jiang, Yangzhou (CN)

(73) Assignee: Board of Regents, The University of Texas System, Austin, TX (US)

( * ) Notice: Subject to any disclaimer, the term of this patent is extended or adjusted under 35 U.S.C. 154(b) by 359 days.

(21) Appl. No.: 12/696,896

(22) Filed: Jan. 29, 2010

(65) Prior Publication Data

US 2010/0198421 A1 Aug. 5, 2010

Related U.S. Application Data

(60) Provisional application No. 61/148,901, filed on Jan. 30, 2009.

(51) Int. Cl.
*H02J 7/00* (2006.01)
(52) U.S. Cl.
USPC .......................................... 700/297; 700/287
(58) Field of Classification Search .................. 700/287, 700/297
See application file for complete search history.

(56) References Cited

U.S. PATENT DOCUMENTS

| | | | |
|---|---|---|---|
| 7,102,251 B2* | 9/2006 | West | 307/64 |
| 7,117,044 B2* | 10/2006 | Kocher et al. | 700/34 |
| 7,227,277 B2 | 6/2007 | Chapman et al. | |
| 7,664,577 B2* | 2/2010 | Yamamoto et al. | 700/287 |
| 7,701,087 B2* | 4/2010 | Eckroad et al. | 307/46 |
| 2002/0175657 A1 | 11/2002 | Leboe | |
| 2003/0007369 A1 | 1/2003 | Gilbreth et al. | |
| 2003/0222502 A1 | 12/2003 | Takahashi et al. | |
| 2006/0276938 A1 | 12/2006 | Miller | |
| 2008/0039980 A1 | 2/2008 | Pollack et al. | |
| 2008/0167756 A1* | 7/2008 | Golden et al. | 700/297 |
| 2008/0205088 A1 | 8/2008 | Chung et al. | |
| 2009/0326724 A1* | 12/2009 | Lasseter et al. | 700/287 |
| 2010/0023174 A1* | 1/2010 | Nagata et al. | 700/287 |

FOREIGN PATENT DOCUMENTS

JP 2004032983 1/2004

OTHER PUBLICATIONS

PCT/US2010/022626 Search Report, Aug. 27, 2010, (3 Pages).
PCT Written Opinion for PCT Application No. PCT/US2010/022628 dated Aug. 27, 2010 (4 unnumbered pages).

* cited by examiner

*Primary Examiner* — Ryan Jarrett
(74) *Attorney, Agent, or Firm* — Chowdhury & Georgakis, P.C.

(57) ABSTRACT

Methods and systems for energy management are disclosed. An example system includes a first port connected to an energy storage device for bidirectional flow of energy, a second port connected to an energy source device for unidirectional flow of energy, a third port connected to a utility grid for bidirectional flow of energy, and a unified control system with control logic configured to simultaneously control energy flow between the first, second, and third ports based on at least two factors from the group consisting of: a state of charge of the energy storage device, a state of the energy source device, and a state of the utility grid. Other embodiments are described and claimed.

25 Claims, 33 Drawing Sheets

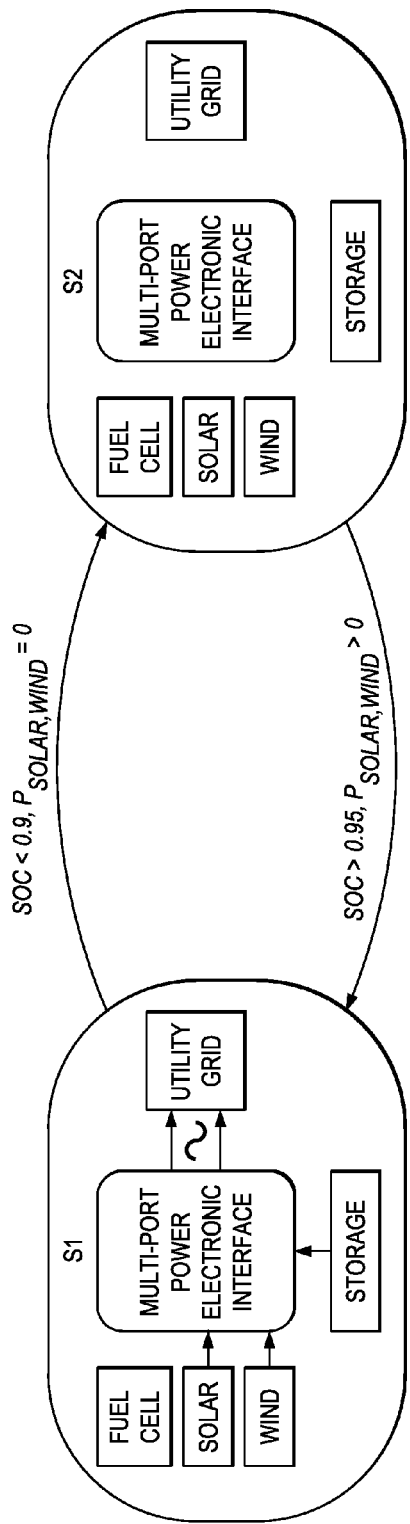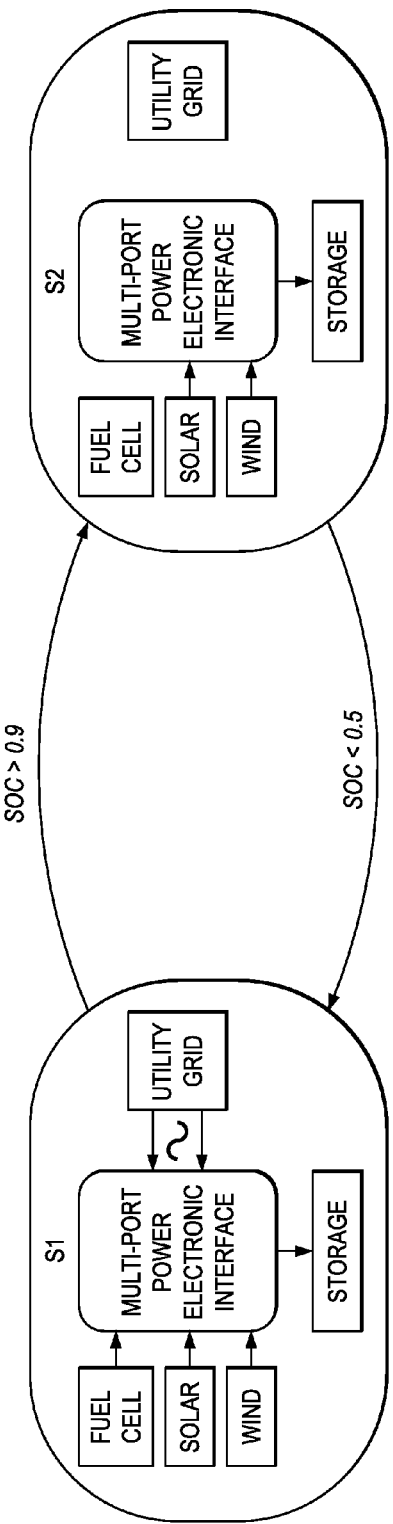
FIG. 18(b)
FIG. 18(c)

METHODS AND APPARATUS FOR DESIGN AND CONTROL OF MULTI-PORT POWER ELECTRONIC INTERFACE FOR RENEWABLE ENERGY SOURCES

CROSS REFERENCE TO RELATED APPLICATIONS

This application claims the benefit of the filing date of U.S. provisional patent application No. 61/148,901, incorporated herein by reference, which was filed on Jan. 30, 2009, by the same inventors of this application.

FIELD OF THE INVENTION

The present invention generally relates to energy management systems. More particularly, the invention relates to systems for the simultaneous harvest, storage, and dispatch of electrical power.

BACKGROUND OF THE INVENTION

The embodiment described herein relates generally to the field of power systems and advanced power electronics topology, particularly to the design, modeling, and control of such systems.

Conventional methods and systems to harvest and process multiple renewable energy sources may rely on distinct individual power electronic infrastructure for each source. These distinct individual power electronic infrastructures may share alternating current (AC) bus or intermediate direct current (DC) bus, to form a distributed generation system (DGS). However, such a system does not provide sufficient load regulation, as well as beneficial interactions between different sources. Power dispatching within such a system is coordinated inefficiently, due to the loose structure of DGSs. Furthermore, system cost for conventional DGSs is high.

The embodiment or embodiments described herein may solve those problems as well as others by proposing a new concept of Multi-port Power Electronic Interface (MPEI).

SUMMARY

In one respect, disclosed is an energy management system comprising a first port configured for bidirectional flow of energy and connected to an energy storage device, a second port configured for unidirectional flow of energy and connected to an energy source device, a third port configured for bidirectional flow of energy and connected to a utility grid; and a unified control system wherein the unified control system comprises control logic configured to operate in a generation mode, a recovery mode, or an emergency/UPS mode and operable to simultaneously control energy flow between the first, second, and third ports based on at least two factors from the group consisting of: a state of charge of the energy storage device, a state of the energy source device, and a state of the utility grid.

In another respect, disclosed is a method for energy management. The method may include configuring a first port connected to an energy storage device for bidirectional flow of energy, configuring a second port connected to an energy source device for unidirectional flow of energy, configuring a third port connected to a utility grid for bidirectional flow of energy, and configuring a unified control system comprising control logic configured to simultaneously control energy flow between the first, second, and third ports based on at least two factors from the group consisting of: a state of charge of the energy storage device, a state of the energy source device, and a state of the utility grid.

Numerous additional embodiments are also possible.

BRIEF DESCRIPTION OF THE DRAWINGS

Features and advantages of the present invention will become apparent from the appended claims, the following detailed description of one or more example embodiments, and the corresponding figures.

FIG. 18(b) is a block diagram illustrating the operation of the MPEI in Generation Mode, in accordance with some embodiments.

FIG. 18(c) is a block diagram illustrating the operation of the MPEI in Recover Mode, in accordance with some embodiments.

DETAILED DESCRIPTION OF ONE OR MORE EMBODIMENTS

Figure 1A:
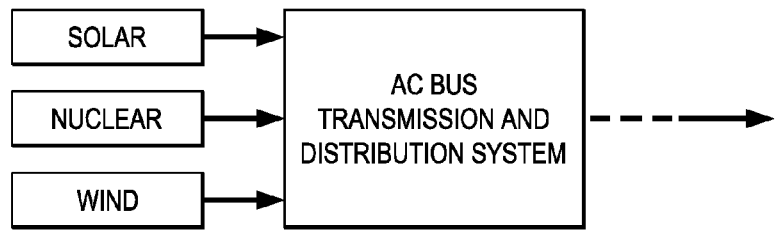
FIG. 1(a) is a block diagram of an example environment using renewable energy sources to reduce the burden on conventional power plants, in accordance with some embodiments.

The drawing figures are not necessarily to scale and certain features may be shown exaggerated in scale or in somewhat generalized or schematic form in the interest of clarity and conciseness. In the description which follows like parts may be marked throughout the specification and drawing with the same reference numerals. The foregoing description of the figures is provided for a more complete understanding of the drawings. It should be understood, however, that the embodiments are not limited to the precise arrangements and configurations shown. Although the design and use of various embodiments are discussed in detail below, it should be appreciated that the present invention provides many inventive concepts that may be embodied in a wide variety of contexts. The specific aspects and embodiments discussed herein are merely illustrative of ways to make and use the invention, and do not limit the scope of the invention. It would be impossible or impractical to include all of the possible embodiments and contexts of the invention in this disclosure. Upon reading this disclosure, many alternative embodiments of the present invention will be apparent to persons of ordinary skill in the art.

Figure 1B:
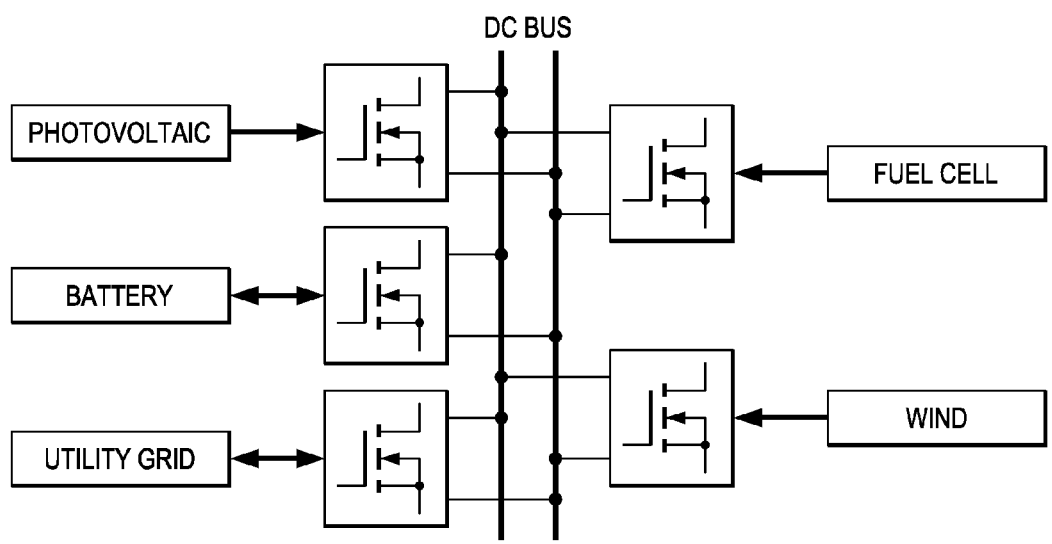
FIG. 1(b) is a block diagram of a local multiple-converter-based DGS sharing the DC bus, in accordance with some embodiments.

Renewable energy sources are getting more attention in a broad range of applications. With more electric components in stationary and mobile applications, the demand for electricity has been increasing over the years, thus imposing an increasing burden on electric generation and transmission infrastructures. Different renewable sources are incorporated in both conventional power processing systems and renewable source powered systems to boost the power output. FIG. 1(a) is a block diagram of an example environment using renewable energy sources to reduce the burden on conventional power plants. Renewable energy based DGSs can reduce the burdens on conventional power plants; however, this would entail an increased investment in the transmission infrastructure. Localized generation can be one of the alternatives to the centralized generation pattern and offer a chance of incorporating energy storage for power leverage. FIG. 1(b) is a block diagram of a local multiple-converter-based DGS sharing the DC bus. Most remote and local DGSs are based on local controller with direct communication capabilities or agent-based decision making mechanisms, among which wind generation is a typical and successful example. However, if renewable sources are locally available to supply low to medium power range applications such as micro-grid, critical industrial zones, and vehicle power systems, the conventional control system structure for DGSs might not be suitable for such dynamic loads. With communication based control systems, cost and reliability are the major concern in terms of hardware implementation. Software delay and data error introduced by communication process may further degrade the performance of such systems.

Some of the previous problems may be addressed by unified multiple-input converter topology. Unified multiple-input converter topology has the advantages of low cost, high power density, and ease of management. Extensive research on multiple-input converter systems in the past five years has resulted in a wide variety of topologies. Generally, multiple-input converter can be classified into two categories: magnetically coupled converter (MCC) and electrically coupled converter (ECC). MCC may be implemented in different ways. Based on the converter topology, flux addition and time domain multiplexing methods are used in MCC to transfer energy from the primary side of converter to the secondary. Bridge topologies, which are based on flux addition principle, may be implemented. With bridge topologies, the power from different sources is transferred to the secondary by adding total flux in magnetic core from each conversion channel. Finally, the power transfer method on multi-input topologies may be implemented where phase angle and leakage inductance are used to control the power flow at each port. MCC offers flexible output voltage level as well as galvanic isolation; however, peripheral circuitry for MCC is very complex and implementation of load sharing among different sources and energy storage elements is complicated (though time multiplexing controlled MCC is straight forward). Additionally, some power regulation methods used in MCC are circuit parameter based, which require more effort to eliminate the parameter drifting problem. In contrast, ECCs are usually implemented with non-isolated topologies, such as buck, boost, and buck-boost switching cells. The power flow control of ECC is relatively straight forward and peripheral circuitry for ECC is usually simple. Although ECC has less flexibility for voltage output, the modular structure and lower cost make ECC more attractive in a variety of applications such as automotive and microprocessor voltage regulators. ECC can be organized in a parallel or series manner. Stacked version of multi-port converters, paralleled switching-cell ECC as the front-end for utility grid applications, mixed switching-mode L-C and charge pump topology, and even uniform boost cells have been used to form multiple-input converter systems for both stationary and mobile applications.

The methods and systems reported to harvest and process multiple renewable energy sources typically rely on individual power electronic infrastructures, which either share AC bus or share intermediate DC bus to form a DGS. However, such a system does not provide sufficient load regulation, necessary interactions between different sources, optimal harvesting, power dispatching, and utility interactions. Also due to the loose/discrete nature of DGSs, system cost is high and reliability is still an issue. Additionally, most methods and systems mainly deal with unidirectional power processing and circuit operation without stressing on modes of sustainable operation which are one of the most desirable features of hybrid power systems. A multi-port system, by contrast, may provide modes of sustainable operation. Also, due to the fact that different renewable sources have their own dynamic range and supply of "fuel," characteristics of renewable sources also have to be considered during the system design. Therefore, topology, control system design, and modes of operation have to be considered throughout the design process.

To remedy the disadvantages of centralized/localized DGSs and current multiple-input converter systems, the concept of Multi-port Power Electronic Interface (MPEI) is disclosed. The term "interface" is adopted here due to the fact that both AC and DC power can be processed and dispatched to the desired port. A five-port system is presented as an example embodiment to elaborate the analysis and design. Integrated digital control systems are proposed to achieve Controlled Quasi Current Source (CQCS) for each input port, such that both steady state and transient power can be shared among different sources and energy storages. Experimental results are provided to show the feasibility of system design.

In some embodiments, Multi-port Power Electronic Interface is a highly integrated version of or replacement for DGSs, while possessing superior system performance and ultimate low engineering cost as a standalone system. As mentioned, existing multiple input and/or output power electronic converters all focus on DC-DC converter parts which are incapable of interfacing with real world applications. The concept of MPEI is addressed herein as the first contribution of MPEI as a self-sustainable multiple input/output static power electronic converter which is capable of interfacing with different sources, storages, and loads. The integrated control system of MPEI enables excellent system dynamic performance and steady state performance, which renders optimal renewable energy harvesting, optimal energy management, and optimal and economical utility grid interactions in a deregulated power market.

In another embodiment, an MPEI may provide two or more levels of control. A first level of control may involve a control routine that provides for optimal harvest of energy from wind, solar, and other green sources. The MPEI would monitor the state of the charge (SOC) of the battery and energy storage system and would use the harvested energy from the green sources to charge the batteries and replenish the energy storage system. A second level of control may provide for optimal exchange of energy to and from an electrical utility grid. For instance, the MPEI may perform energy exchanges based on real time access to the utility price of energy. An energy trade algorithm in the MPEI may consider the price of energy when determining whether the MPEI will sell energy or store energy. A third level of control may provide for communications. A microgrid box may communicate with a dispatch center, such as a public utility office, with regard to power availability, component faults, etc. The MPEI may also provide safeguard to prevent the MPEI from short circuiting or otherwise adversely affecting the grid. Also, an MPEI may provide for exchange of active power and reactive power.

Figure 2:
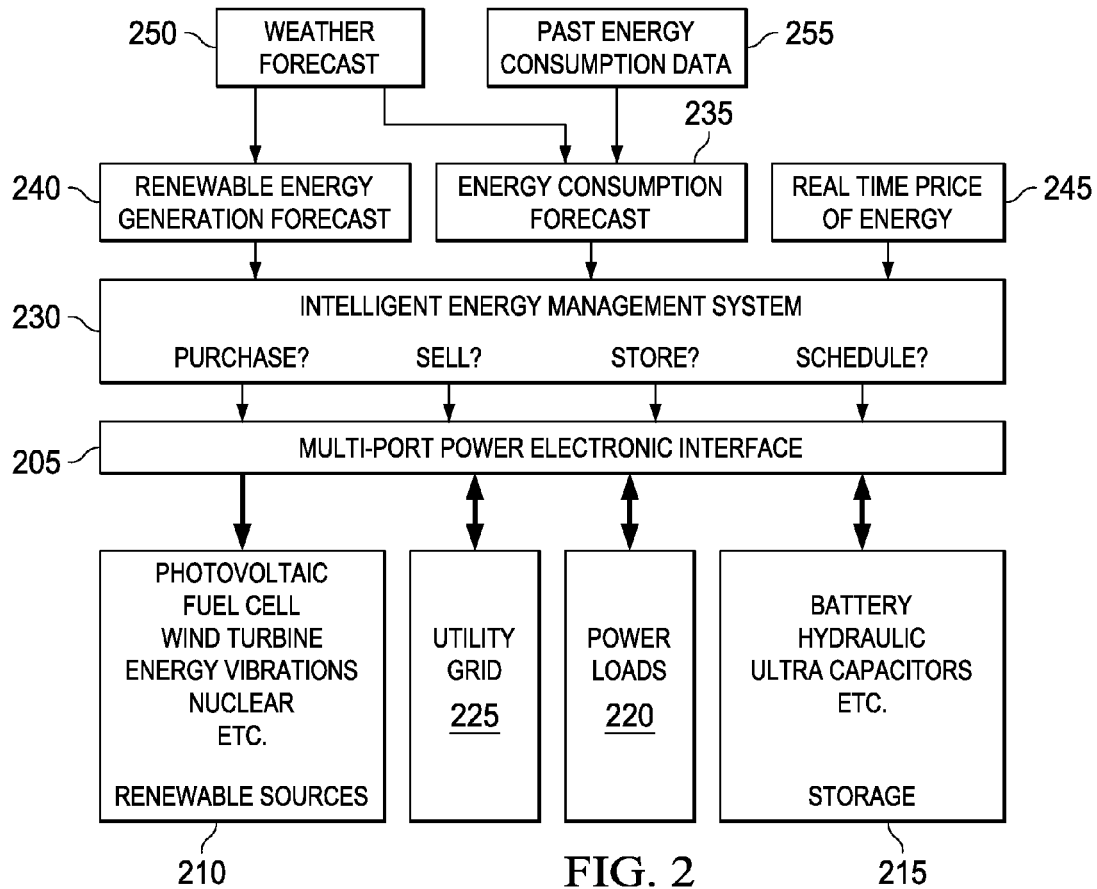
FIG. 2 is a block diagram illustrating the use of an MPEI in the harvesting, storage, and dispatch of electrical power, in accordance with some embodiments.

FIG. 2 is a block diagram illustrating the use of an MPEI in the harvesting, storage, and dispatch of electrical power, in accordance with some embodiments.

In some embodiments, an MPEI as shown in block 205 may be used to simultaneously control the harvest, storage, and dispatch of electrical power by effectively and efficiently managing the bidirectional flow of power between renewable sources 210, storage 215, power loads 220, and the utility grid 225. The renewable sources 210 may be either photovoltaic, fuel cell, wind turbine, energy vibrations, nuclear, and other green energy sources. The storage 215 may consist of battery, hydraulic, ultra capacitors, and other devices where energy can be stored. The MPEI 205 accomplishes this simultaneous control by being interfaced between renewable sources 210, storage 215, power loads 220, and the utility grid 225. The MPEI 205 may rely on an intelligent energy management system (IEMS) 230 in managing the flow of power. The IEMS 230 will use the energy consumption forecast 235 and the renewable energy generation forecast 240, along with the real time price of energy 245 to determine when would be the appropriate time to purchase, sell, store, or schedule energy between the renewable sources 210, storage 215, power loads 220, and the utility grid 225. The energy consumption forecast 235 and renewable energy generation forecast 240 will be based on the weather forecast 250 and past energy consumption data 255.

Figure 3:
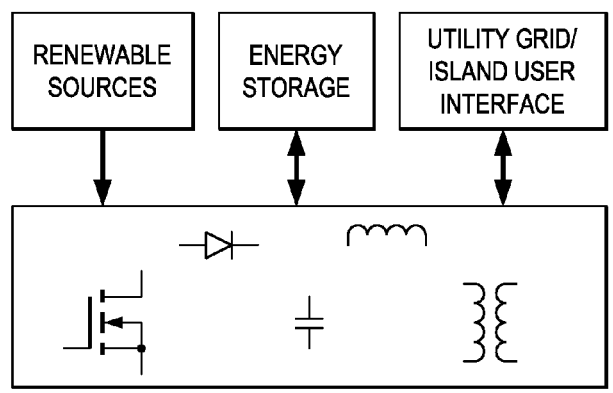
FIG. 3 is a conceptual block diagram of the MPEI in harvesting and managing renewable energy sources, making scheduled dispatch and storage, and interacting with the utility grid, in accordance with some embodiments.

Considering the multiple roles of a generator, power conditioner, and energy storage interface, a multi-port converter is expected to offer direct interface to different sources, storages, and loads, which means that the voltage/current waveforms at the output port are readily usable. A Multi-port Power Electronic Interface is a self-sustainable multiple input/output static power electronic converter which is capable of interfacing with different sources, storages, and loads. The integrated control system of MPEI enables both excellent system dynamic and steady state performance which render optimal renewable energy harvesting, optimal energy management, and optimal and economical utility grid interactions in a deregulated power market. FIG. 3 shows the conceptual block diagram of the MPEI in harvesting and managing renewable energy sources, making scheduled dispatch and storage, and interacting with the utility grid. Different types of renewable sources, energy storages, and conventional power sources are connected to the ports of MPEI in forms of AC and DC power. Similar to its counterpart at signal level, MPEI is a processing and distribution center at power level, which processes and dispatches power to desired terminals with directly usable waveforms. In signal-level processing, the system consumes incidental power and processes information in a variety of ways, however, in power electronic applications, signal integrity and information security is not of concern while power flow control, power conditioning, and mode of operation are of special interests.

Topology selection is based on the actual system requirement. High frequency transformer-based bidirectional MPEI may be able to provide high power density, isolation, and flexible output voltage levels. However, complexity of supporting circuitry lowers the reliability of the system. Also, the inherent current circulating and loss of voltage waveform problem due to magnetic-coupling need further design effort and components to overcome. Therefore, non-isolated converter topologies are a more attractive candidate in MPEI system since it offers simple implementation for reliable operation.

Figure 4:
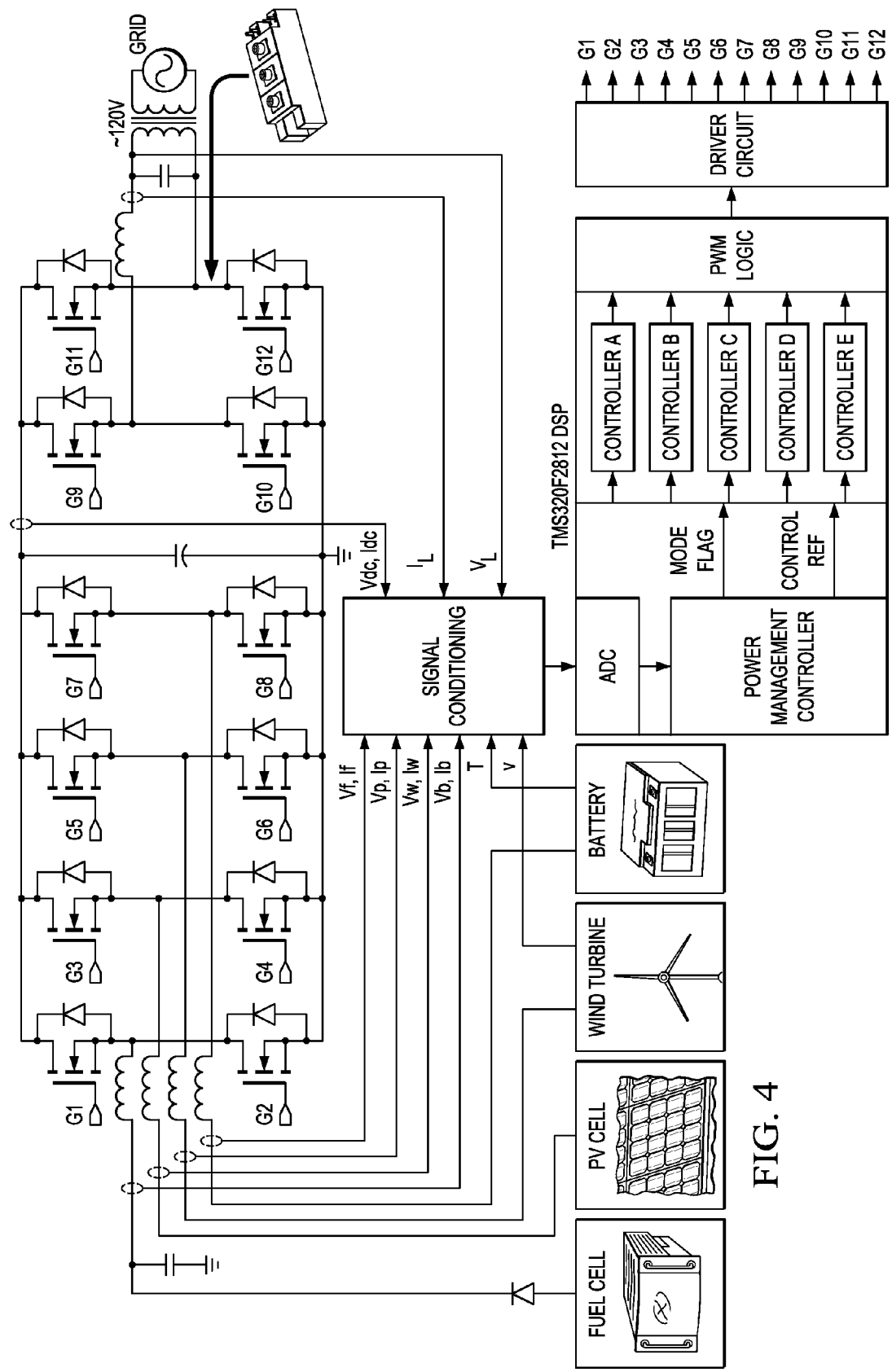
FIG. 4 is a circuit diagram for a five-port MPEI, in accordance with some embodiments.

The circuit diagram for a five-port MPEI is shown in FIG. 4. The MPEI interfaces with fuel cell, wind turbine, solar cell, battery, and utility grid/island user. The design adopts a six-legged topology (using MOSFET), which form three unidirectional boost converters, one buck-boost bidirectional converter, and one bidirectional inverter/rectifier.

With standard phase leg switches, hereinafter referred to as switching cells, the system becomes very modular and easy to integrate. Due to the characteristics of interfaced sources, storages, and loads, a higher voltage is needed on the system DC bus for inverter/DC-DC converter loads. Also, low ripple continuous current should be taken from fuel cell as well as other renewable/storage sources since continuous current will impose less stress on source side. Therefore, a phase leg switch is used as the elementary energy conversion cells in MPEI systems for step-up/step-down operation. Battery switching cells are bidirectional since batteries serve as energy buffer as well as storage. In discharging mode, the battery supports load demand under boost operation, while in charging mode, phase-leg is used as a buck converter to charge the battery. The full bridge on the AC interface terminal can work either as inverter or rectifier. The system is digitally controlled such that more flexible operation can be achieved and component count can be minimized. Scalability and versatility of phase-leg structured MPEI makes the system more attractive in microgrid and automotive applications. For example, renewable sources/energy storages of different terminal characteristics (AC or DC source) can be integrated into MPEI easily. The phase-leg can be further configured as either a multiple phase rectifier or a multi-phase DC-DC converter as well.

Figure 5:
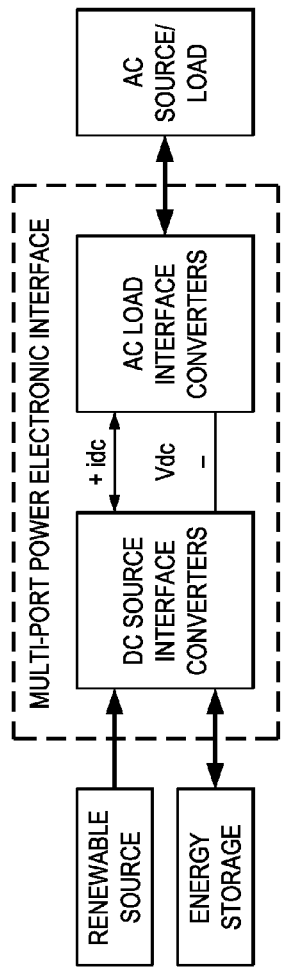
FIG. 5 is a block diagram illustrating the partition arrangement of the MPEI, in accordance with some embodiments.

As a power interface, MPEI does not store energy; renewable or conventional power is optimally harvested and power flow will go either to energy storage or to AC port for the grid and island user. As indicated in FIG. 4, power processing in MPEI has two stages: pre-conditioning and load conditioning. Therefore, an intermediate goal exists in MPEI to achieve a solid voltage or current link for downstream converters. Another fact is that the AC interface does not necessarily operate at the same switching frequency as the DC interfaces due to the different power processing capacity. The AC interface usually operates at lower switching frequency to avoid excessive switching losses. Based on above facts, the MPEI system can be further partitioned into a front-end converter system as a DC source interface and a load-end converter system as an AC load interface. In this patent, to simplify the analysis, four DC-DC converters are treated as source interfaces while a single phase inverter is treated as load interface. The partition arrangement of the MPEI is shown in FIG. 5. The DC source interface processes the power from the renewable sources and energy storages and supports a stable DC-link. The energy flow at renewable energy ports is unidirectional and at energy storage ports the energy flow is bidirectional. The AC load interface subsystem deals with its own load and is supplied by solid DC-link voltage. From this perspective, modeling and control system design can be done for separate converter subsystems. The modeling and control of source interface will be addressed since major power conditioning and power sharing processes are handled by the source interface subsystem.

As illustrated in FIG. 5, the MPEI system is partitioned into load and source interface for the convenience of analysis; each subsystem can be characterized, modeled, and properly controlled. The method to evaluate the MPEI system stability is available as Middlebrook's criteria on small signal level. Equation (1) indicates the criteria for asymptotic stability of a voltage controlled DC-link system by studying the subsystem impedance, where $Z_o$ is the output impedance of source interface subsystem and $Z_i$ the input impedance of load interface subsystem. The stability is ensured if the eigenvalues of the transfer function H(s) are located in the left hand side the imaginary axis.

$$H(s) = \frac{Z_i}{Z_o + Z_i} \quad (1)$$

Figure 7:
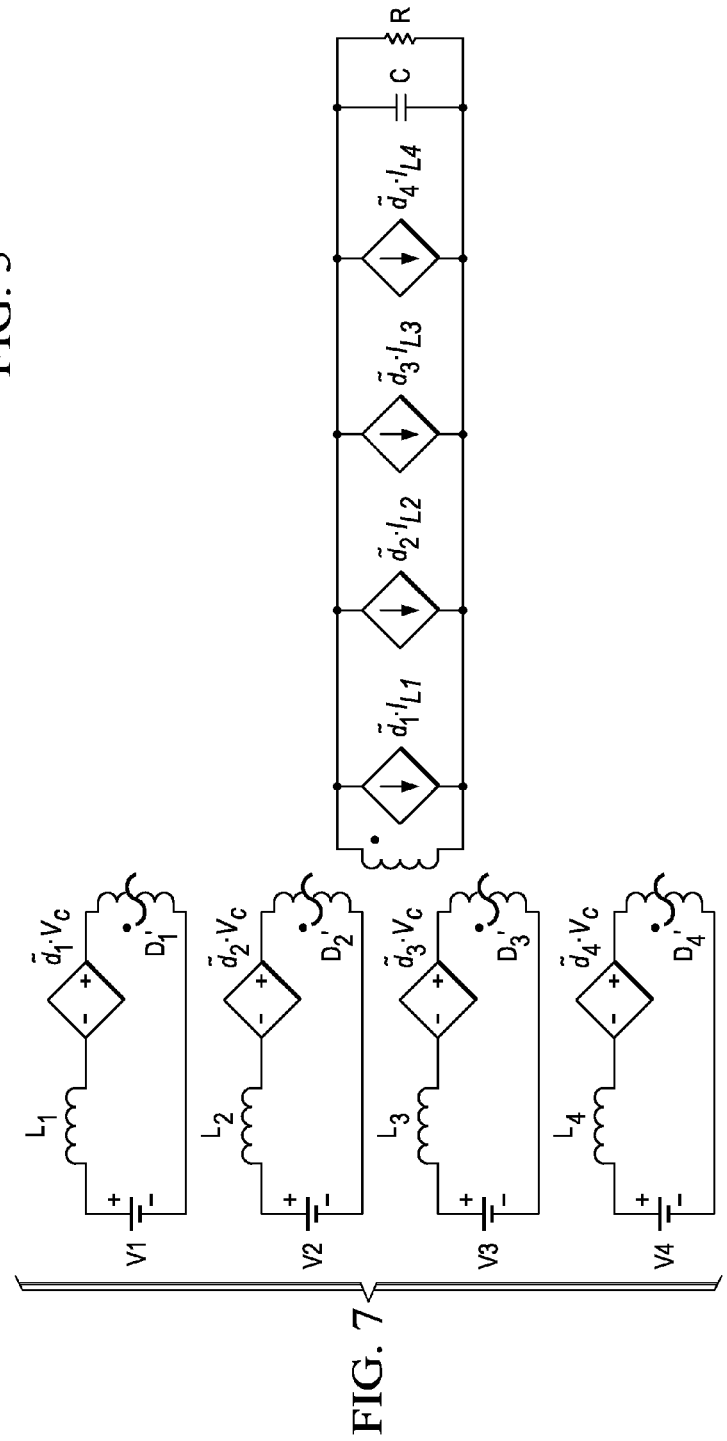
FIG. 7 is a schematic illustration of the resulting large signal model with perturbation, in accordance with some embodiments.
Figure 6:
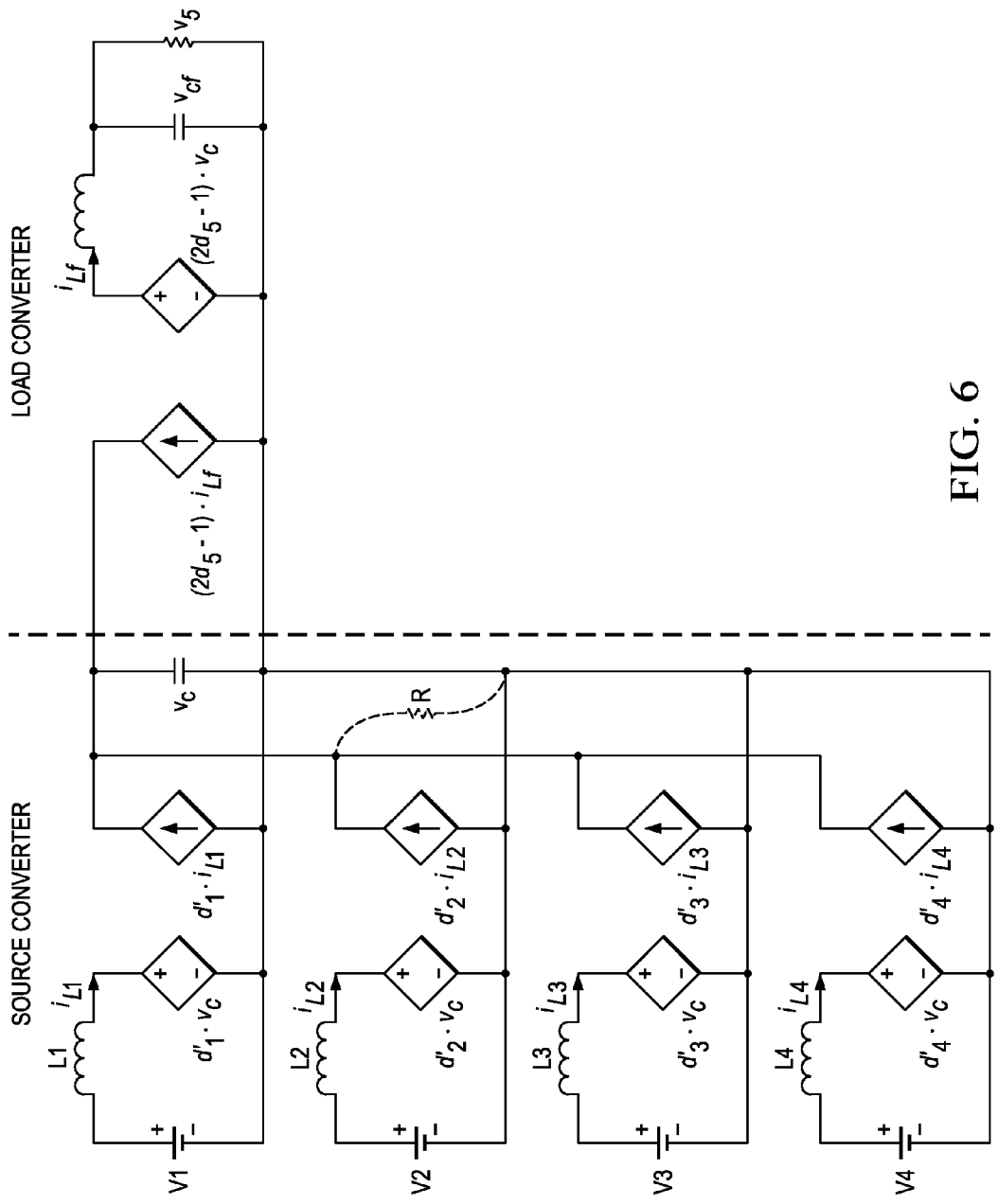
FIG. 6 is a schematic illustration of the equivalent circuit model derived for the four-port source interface subsystem, in accordance with some embodiments.

The equivalent circuit model derived for the four-port source interface subsystem is schematically illustrated in FIG. 6. The average switch modeling method is used to obtain the large signal model of the system on the assumption of continuous current mode (CCM) operation. Considering the fact that the dynamics of renewable sources are decades lower than the proposed system control bandwidth, solid DC sources are used to model the four different sources and storages in the average model. Small signal variations from source side are ignored. A resistive load instead of converter load is used when analyzing source interface subsystem due to relatively large DC-link capacitance. Small signal perturbations are applied to the state variables (inductor current in each switching cell $L_i$ and DC-link voltage $v_C$) and control variables ($D_i$). The resulting large signal model with perturbation is schematically shown in FIG. 7. The open-loop control-to-output transfer function matrix can be found as in equation (2).

$$\begin{bmatrix} \Psi_{11} & \Phi_{12} & \Phi_{13} & \Phi_{14} \\ \Phi_{21} & \Psi_{22} & \Phi_{23} & \Phi_{24} \\ \Phi_{31} & \Phi_{32} & \Psi_{33} & \Phi_{34} \\ \Phi_{41} & \Phi_{42} & \Phi_{43} & \Psi_{44} \end{bmatrix} \cdot \begin{bmatrix} d_1 \\ d_2 \\ d_3 \\ d_4 \end{bmatrix} = \begin{bmatrix} \alpha_1 \\ \alpha_2 \\ \alpha_3 \\ \alpha_4 \end{bmatrix} \cdot \tilde{v}_C \quad (2)$$

where $$\Psi_{ii} = V_C - \frac{I_{Li} L_i s}{D'_i};$$

$$\Phi_{ij} = -\frac{I_{Lj} L_i s}{D'_i}, i \neq j; \text{ and}$$

$$\alpha_i = D'_i + \frac{L_i s (RCs + 1)}{RD'_i}, i, j = 1, 2, 3, 4.$$

$L_i$ is the input inductance, C is the capacitor on the DC bus, R is the equivalent load resistance, $V_i$ is the source voltage, $I_{Li}$ is the inductor average current, $V_c$ is the DC-link capacitor average voltage, and $D'_i = 1 - D_i$, where $D_i$ is the steady-state duty cycle value. It can be easily observed that with the common task of stabilizing the DC-link voltage, different switching cells inject disturbances into the DC-link. In the simplest case where there is single-input and single-output, the transfer function matrix can be reduced to the scalar version, which is exactly the control-to-output transfer function of a boost converter.

To interpret the transfer function matrix, the system operation under multiple-source input should be addressed first. There are two tasks for the source-interface system: stabilizing the DC-link voltage for downstream converters and regulating the input power for better power leverage. Therefore, at least one switching cell should be used to stabilize the DC-link voltage while the rest can contribute to power flow control by regulating input currents. To stabilize the DC-link voltage using the $i^{th}$ switching cell, the $i^{th}$ row in equation (2) should be used. The voltage stabilizing effort is mainly contributed by the transfer function $\tilde{v}_C / \tilde{d}_i$ while the injected disturbances are from the off-diagonal terms in the $i^{th}$ row by $\tilde{v}_C / \tilde{d}_j$, where $j \neq i$.

Figure 8:
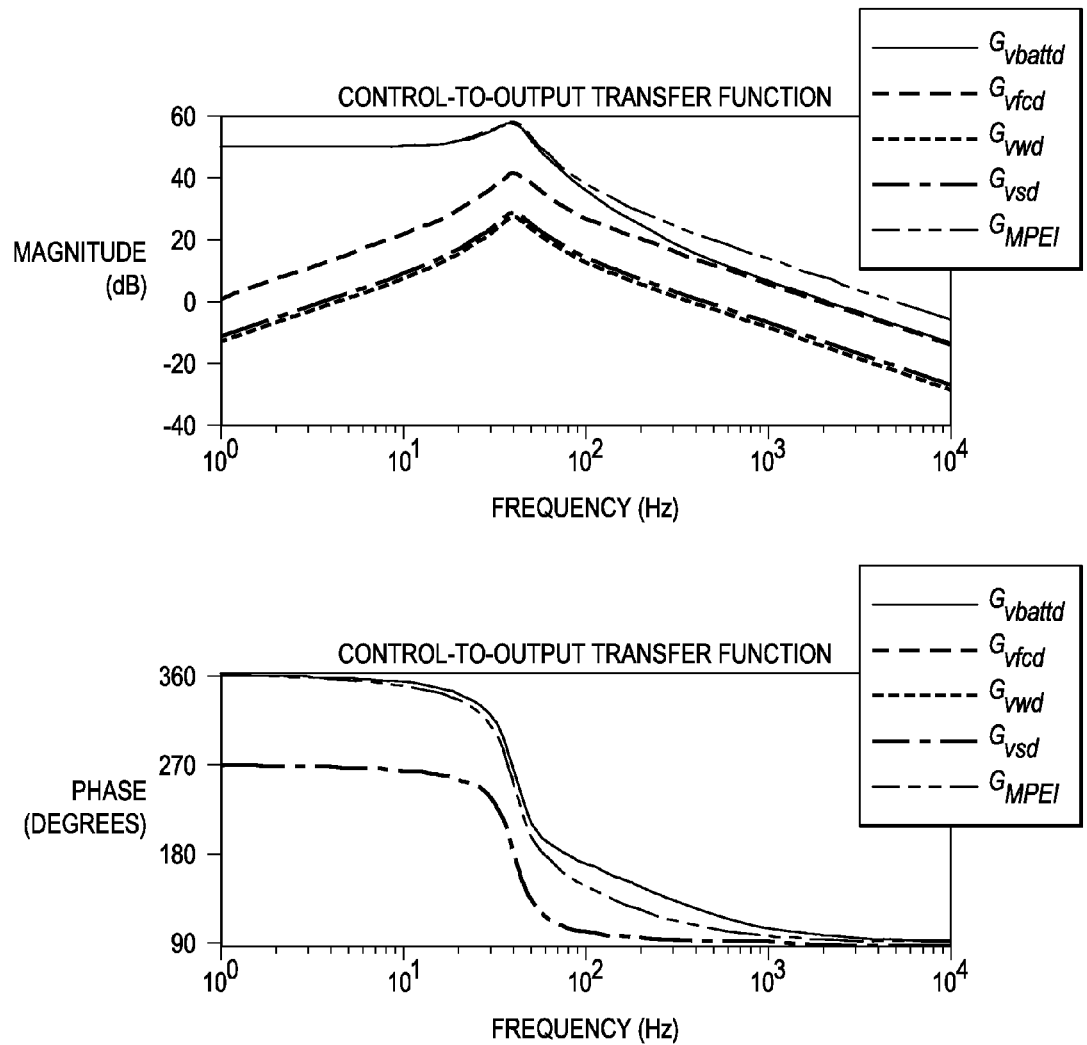
FIG. 8 is a Bode plot for the scenario where the battery port is selected to operate under voltage-mode while the other ports are selected to operate under current-mode, in accordance with some embodiments.

If one port (battery as source) is selected to operate under voltage-mode, and the other ports (fuel cell, wind turbine and solar panel) are operated under current-mode, interferences from other non-voltage-controlled switching cells have to be considered in the control system design. FIG. 8 shows the Bode plot for this scenario. As can be observed, current-mode operated switching cells contribute to modification of frequency-domain responses after the resonant frequency.

Figure 9:
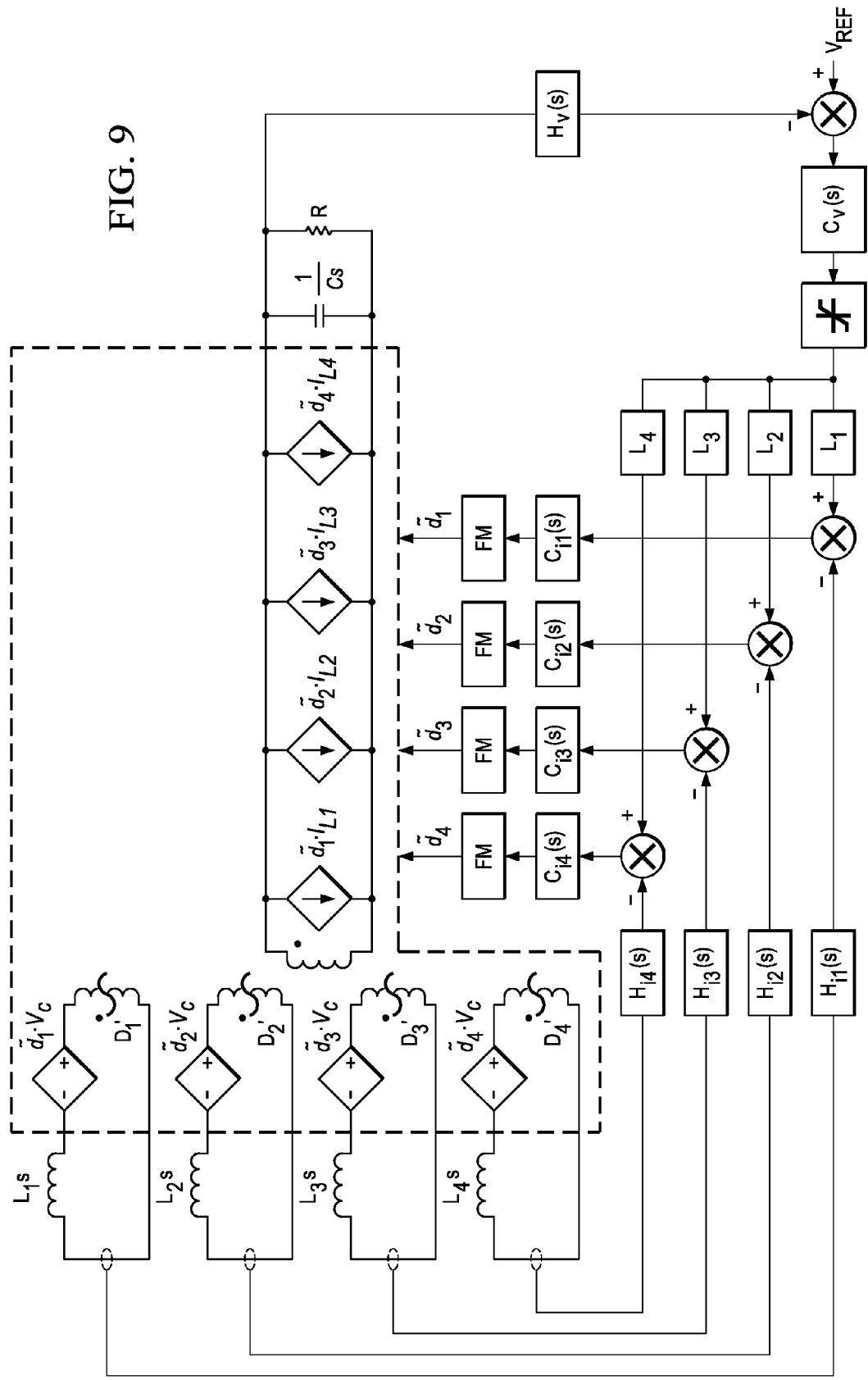
FIG. 9 is an illustration of the integrated control system structure based on the small signal model, in accordance with some embodiments.

A control system organized in an integrated manner has several important advantages over the conventional distributed version. First, the reference values and control variables can be passed to individual controllers internally without propagation delay or error. Second, it is more efficient in implementing state transition. The integrated control system structure based on the small signal model is illustrated in FIG. 9, where $H_v(s)$ is the voltage transducer gain, $H_{ix}(s)$ is the current transducer gain, $C_v(s)$ is the voltage controller, $\vec{L}$ is the control vector for load sharing control, $C_{ix}(s)$ is the current controller, FM is the pulse width modulation (PWM) gain, and x=1, 2, 3, 4. The cascaded control structure takes the voltage controller output as the internal reference for the current controller, forming an average current-mode control (ACM) for each controller channel. Using ACM control in a paralleled-cascaded structure enables several degrees of freedom in control. Both the DC-link voltage and the currents at i-1 ports (given total i input ports) are controllable. Therefore, inductor currents can be regulated directly or indirectly for power dispatching/load sharing purposes. As shown in FIG. 9, output voltage (DC-link) voltage is sensed and fed back to compare with the voltage reference. The resulting voltage error is amplified by the voltage controller to generate a current reference. This programmed current reference signal is scaled by the control vector $\vec{L}=[L_1, L_2, L_3, L_4]$ and fed into individual current controllers respectively. Since current reference for each controller is different, current in each inductor can be precisely controlled for power dispatching purposes. If no power sharing is needed, all ports can also work under even-current sharing mode with control vector bypass ($L_x=1$).

As explained before, at least one element in $\vec{L}$ is bypassed to support a stable DC-link voltage. The other elements can be configured to interval (0, 1) to program the proper reference values for direct current control. In fact, enforcing update of $L_x$ element will vanish, however not completely, and the effort of the outer voltage control loop will shape the inductor currents into desired steady state values. With the control vector inserted into the cascaded control structure, the steady state value of Controlled Quasi-Current-Sources (CQCS) can be fully controlled by the control vector $\vec{L}$. However, in a dynamic scenario, CQCSs can share the dynamics propagated from the outside voltage loop and reduce the current stress in the desired power source. Equation (3) gives the expression for total input current $I_{IN}$ in terms of current loop reference $I^*_{Ref}$ and control vector element $L_x$ for a four-port source interface. The term $|H_{ix}(s)|$ refers to the DC gain of the current transducer.

$$\sum_{x=1}^{4} \frac{I^*_{Ref} \cdot L_x}{|H_{ix}(s)|} = I_{IN} \quad (3)$$

Given the same current transducer gain for all port currents measurement, the current in each conversion channel can be simplified as shown in equation (4), which is indeed a weighted current distribution based on element $L_x$.

$$I_x = \frac{L_x}{\sum_{x=1}^{4} L_x} \cdot I_{IN} \quad (4)$$

In fact, there is no constraint in choosing $L_x$ value as indicated in equation (4), and in theory $L_x \in [0,\infty]$. However, considering practical implementation in digital systems, only the interval [0,1] is chosen in this embodiment.

Figure 10:
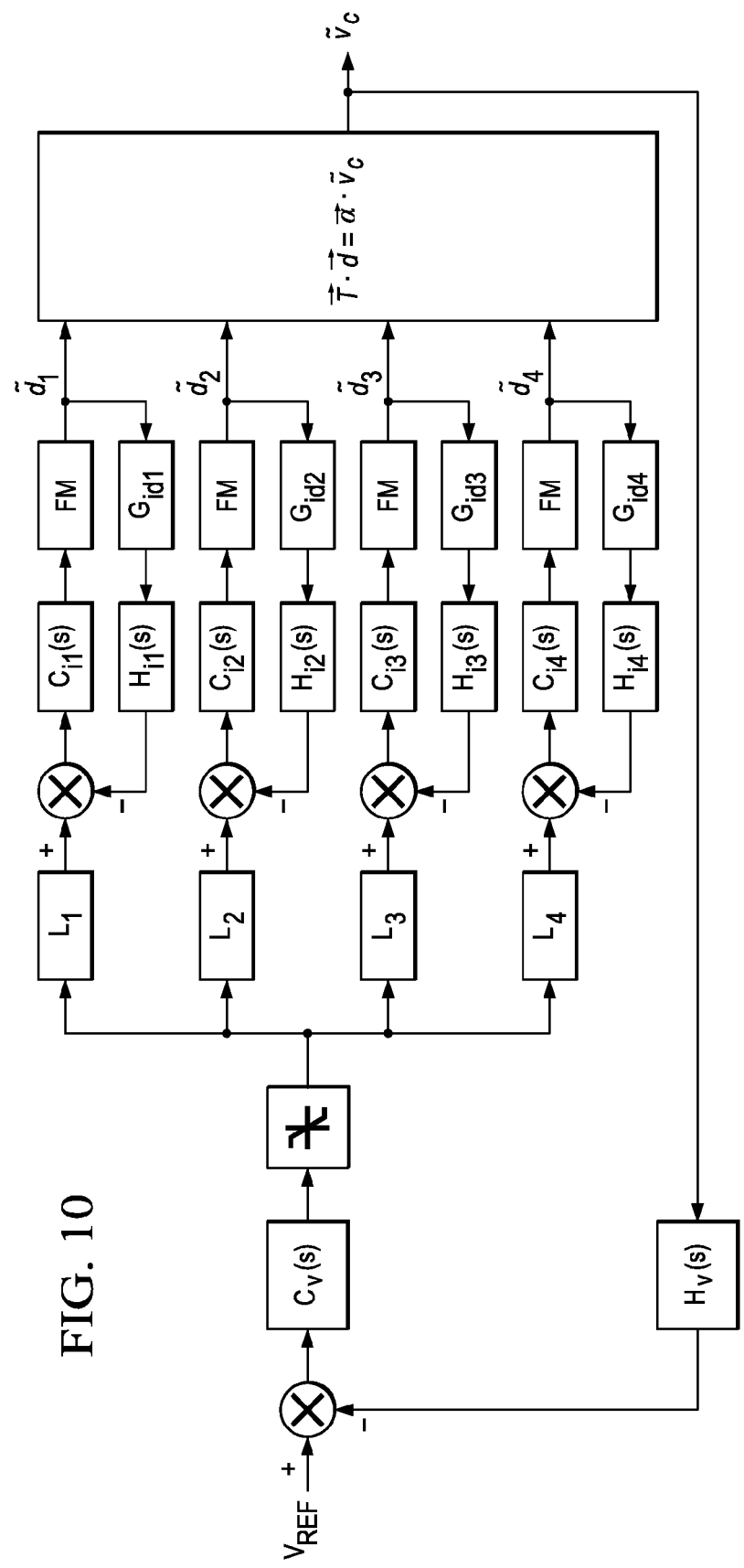
FIG. 10 is a block diagram showing the detailed control loop, in accordance with some embodiments.

Local power management is realized by maximum power tracking of solar/wind power and power flow control based on power balance. Since solar and wind power is under direct control, desired current distribution in fuel cell and battery can be easily calculated. Maximum power tracking is implemented using the Perturbation & Observation method (P&O). The control reference for solar and wind port currents are perturbed and updated on a timely basis in order to approach the maximum power point. It has to be pointed out that although the current commands for solar and wind ports are directly fed, in order to keep the generality, control loop design is still based on the control structure shown in FIG. 9. The detailed control loop is illustrated in FIG. 10 in terms of transfer function blocks, where $G_{id_x}(s)$ is the control-to-current transfer function. The generated control variable $\tilde{d}_x$ is fed into the transfer function matrix, equation (2), to obtain output voltage $\tilde{v}_C$.

Since a double-loop structure is used, bandwidth separation is a must. With CQCS control, the fuel cell current is the direct controlled state variable. The bandwidth of the fuel cell current loop should be as low as possible to relieve the current stress of the fuel cell membrane. In DC load applications, the bandwidth of the fuel cell current loop can be selected as low as possible with half a decade separation from the voltage control loop. However, more constraints apply to the MPEI case since the load of the source interface is a single phase inverter, which will inject 120 Hz ripple into the DC-link. Therefore, at least half a decade of bandwidth separation from 120 Hz is desirable for both the current controller and the voltage controller. In this embodiment, the current and voltage control loops will be designed for one input-port operation as well as four input-port operation. The MPEI power rating and circuit parameters are listed in Table I and II.

TABLE I

MPEI Power Distribution

| Fuel Cell | Battery | Wind Turbine | Solar |
|---|---|---|---|
| 1 kW | 1.2 kW | 400 W | 400 W |

TABLE II

MPEI Passive Components

| | |
|---|---|
| Fuel Cell Inductor | $L_{FC}$ = 595 µH |
| Battery Inductor | $L_{Battery}$ = 534 µH |
| Solar Inductor | $L_{PV}$ = 845 µH |
| Wind Inductor | $L_{Wind}$ = 1000 µH |
| DC-link capacitor | $C_{DC-link}$ = 2900 µF |

Figure 11:
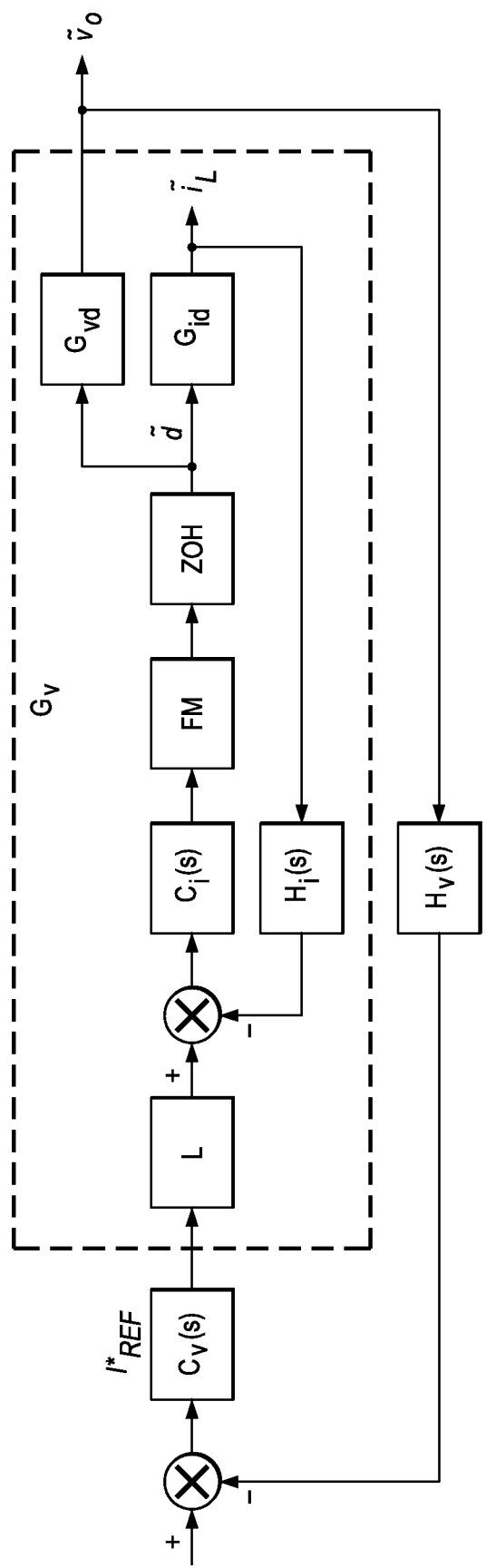
FIG. 11 is a block diagram showing the detailed control loop under single-input operation, in accordance with some embodiments.
Figure 12A:
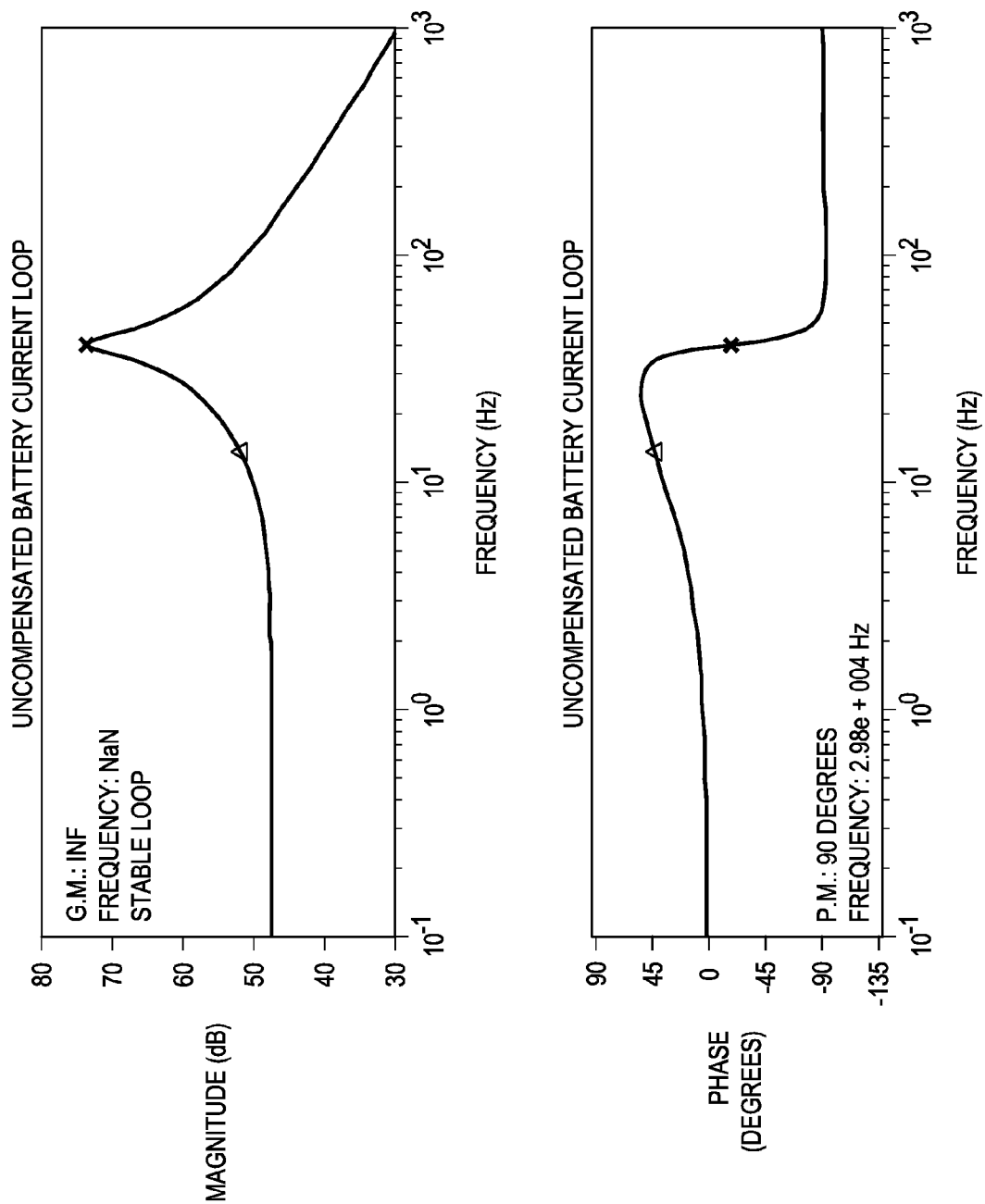
FIGS. 12(a)-12(b), 13(a)-13(b), 14(a)-14(b), and 15(a)-15(b) are graphs showing the frequency responses of the uncompensated and the proportional and integral controller compensated open-loop transfer function for the inner current loops for the battery, fuel cell, solar, and wind, in accordance with some embodiments.
Figure 12B:
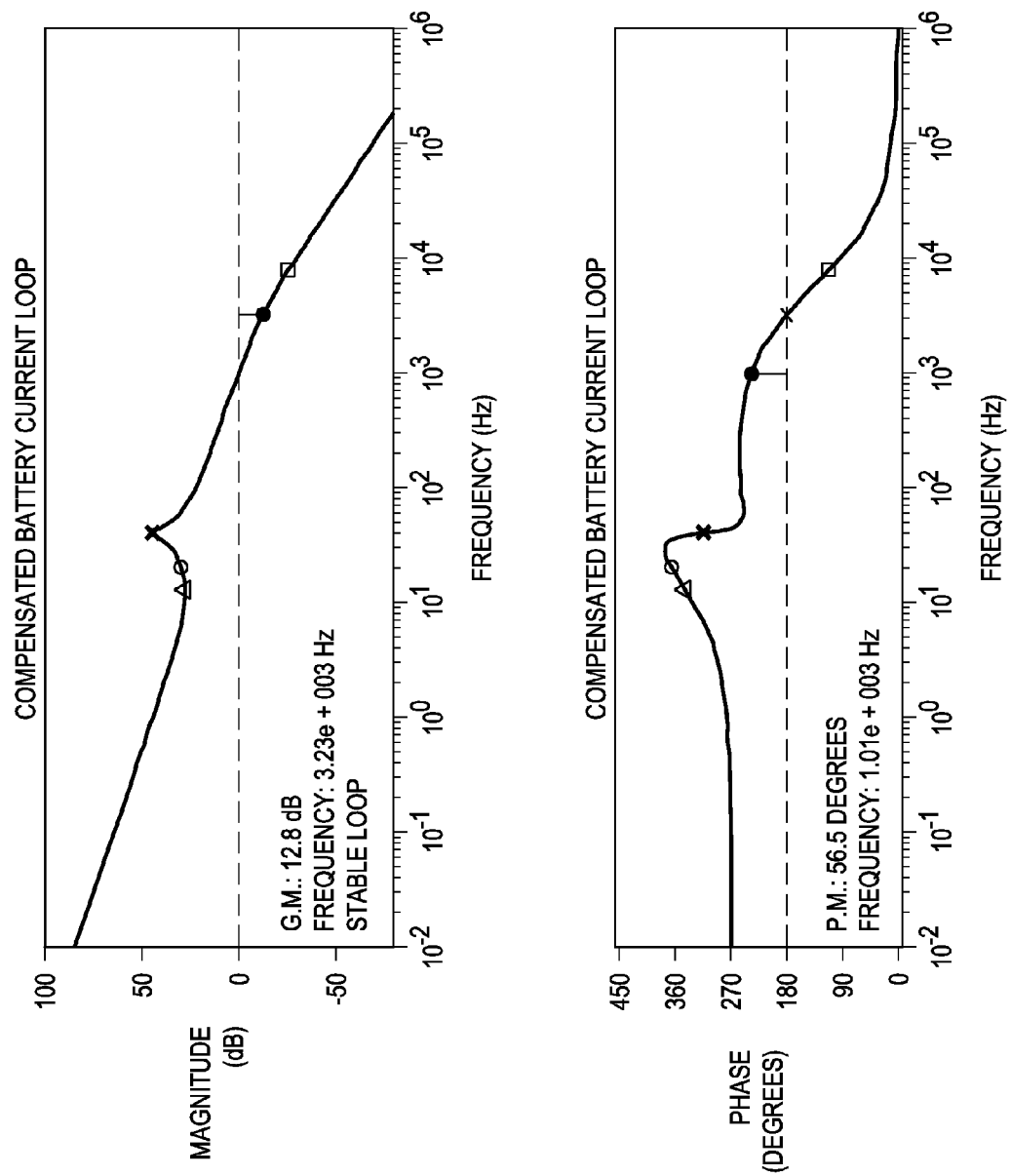
Figure 13A:
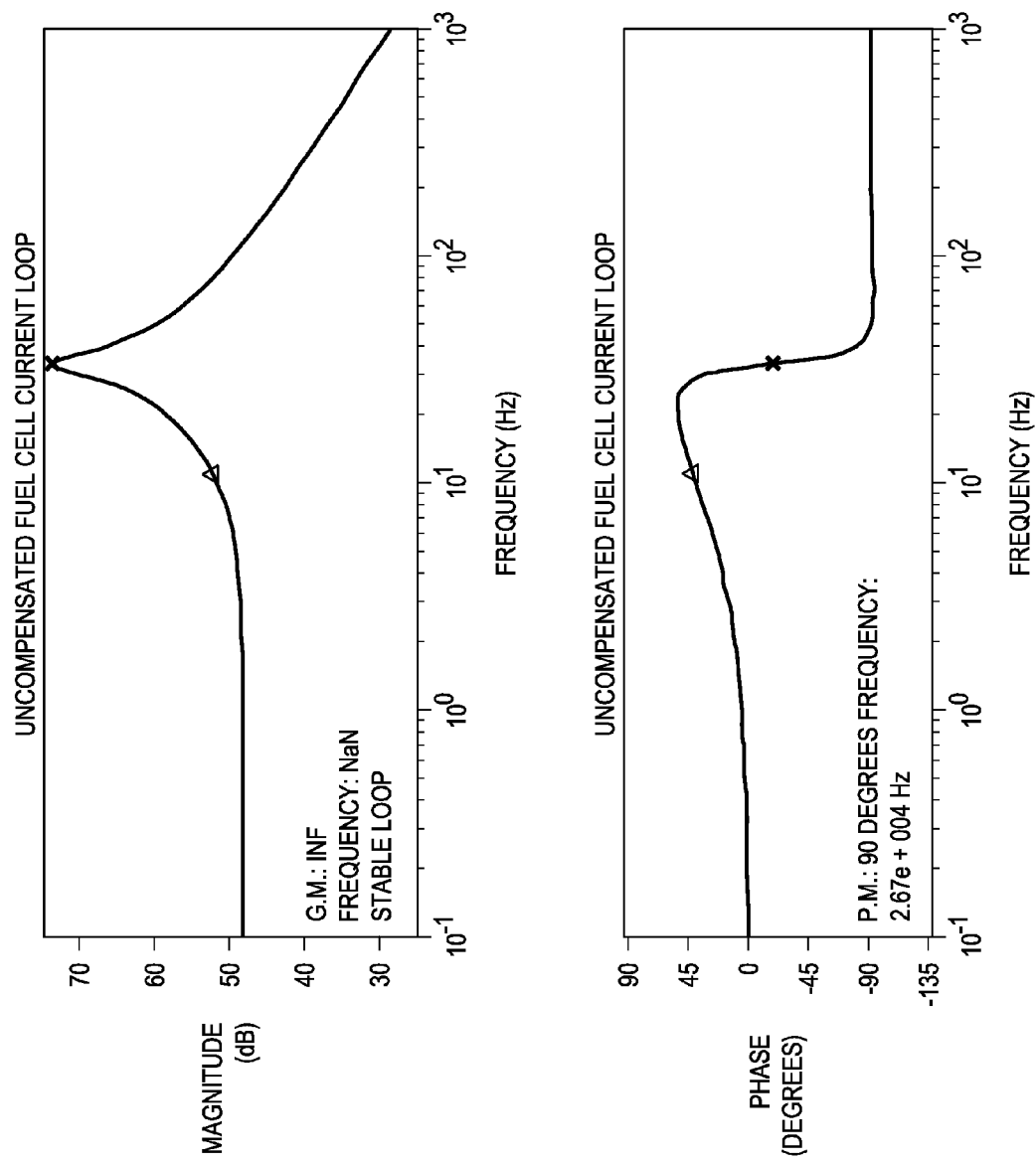
Figure 13B:
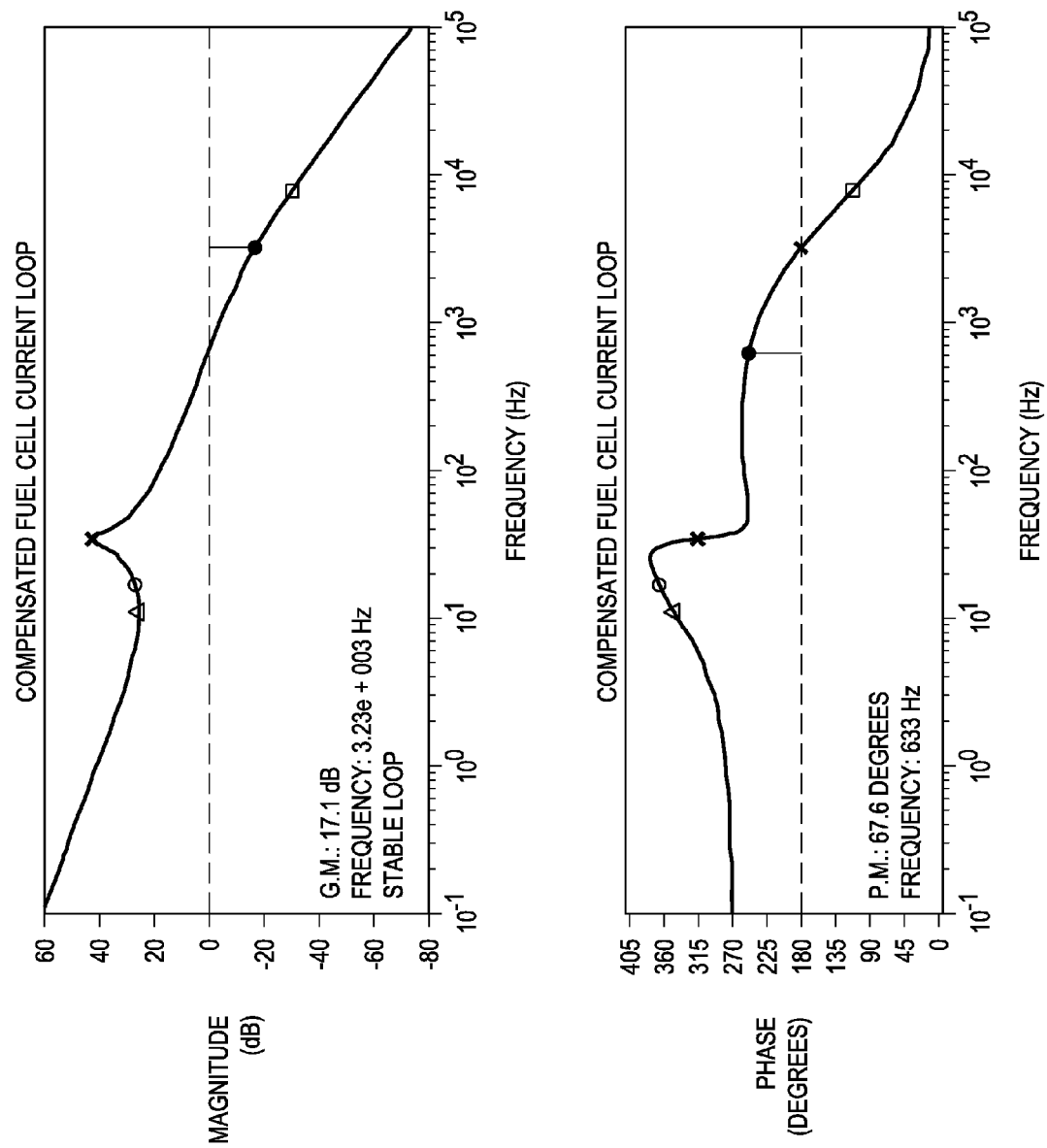
Figure 14A:
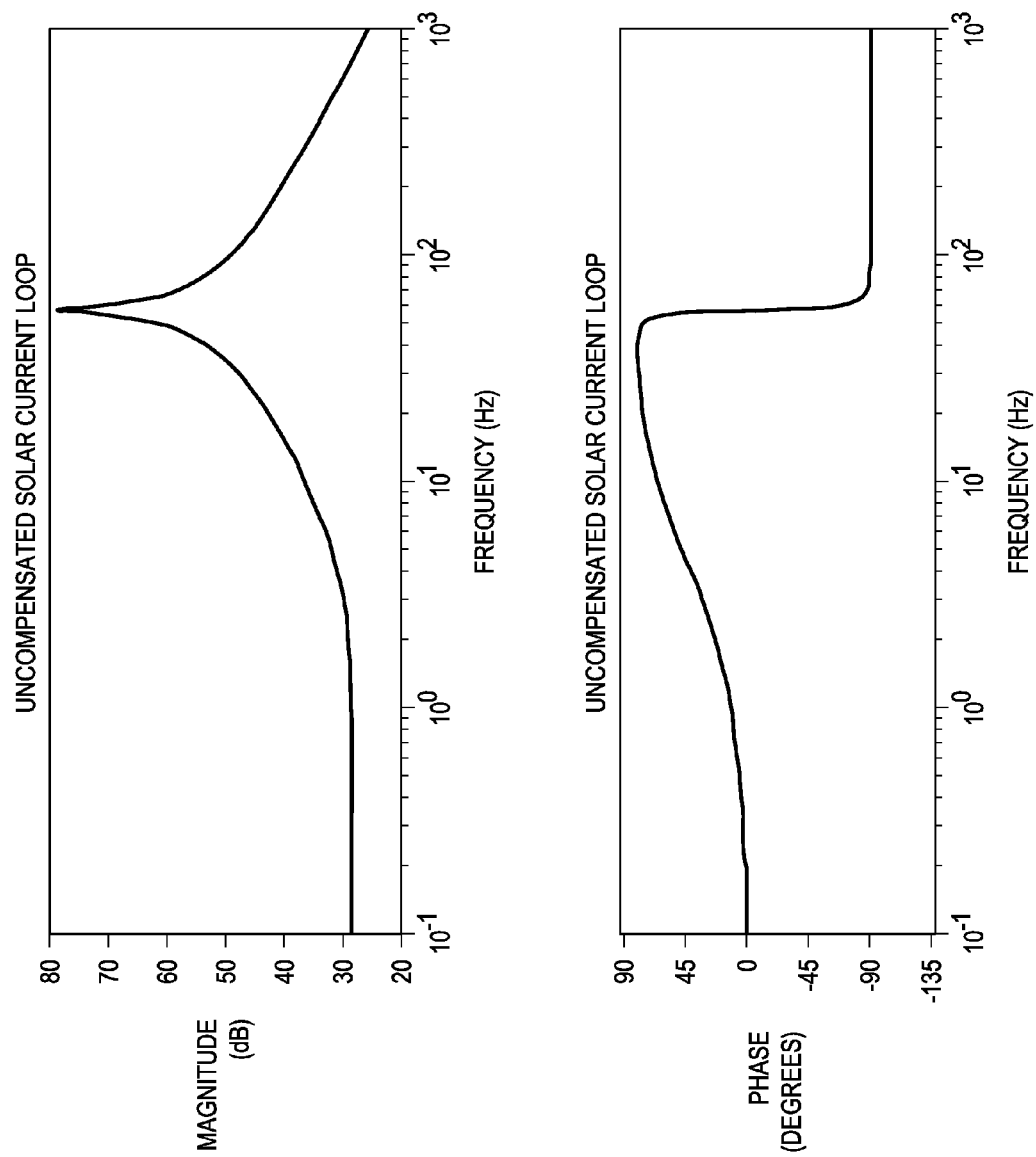
Figure 14B:
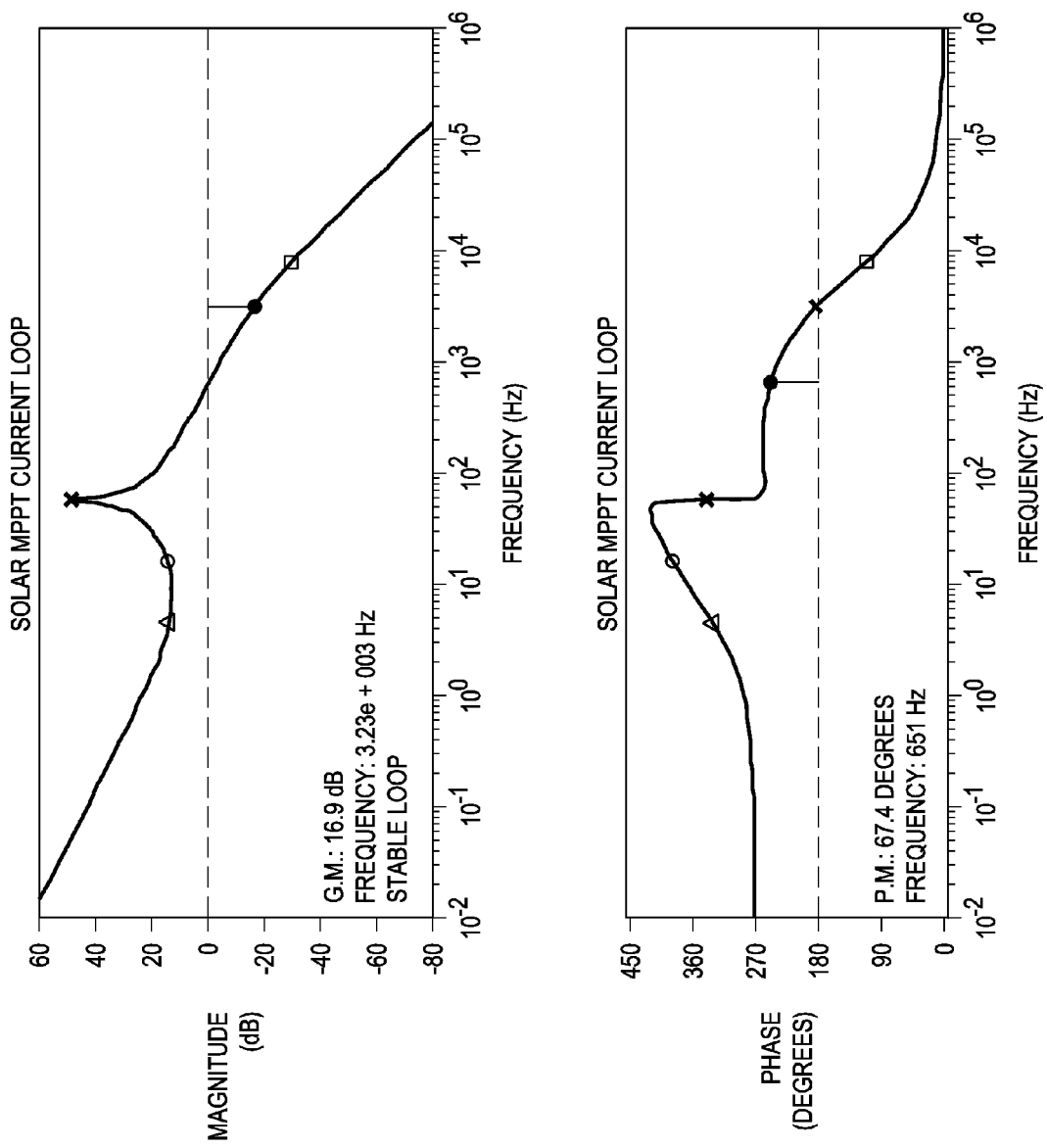
Figure 15A:
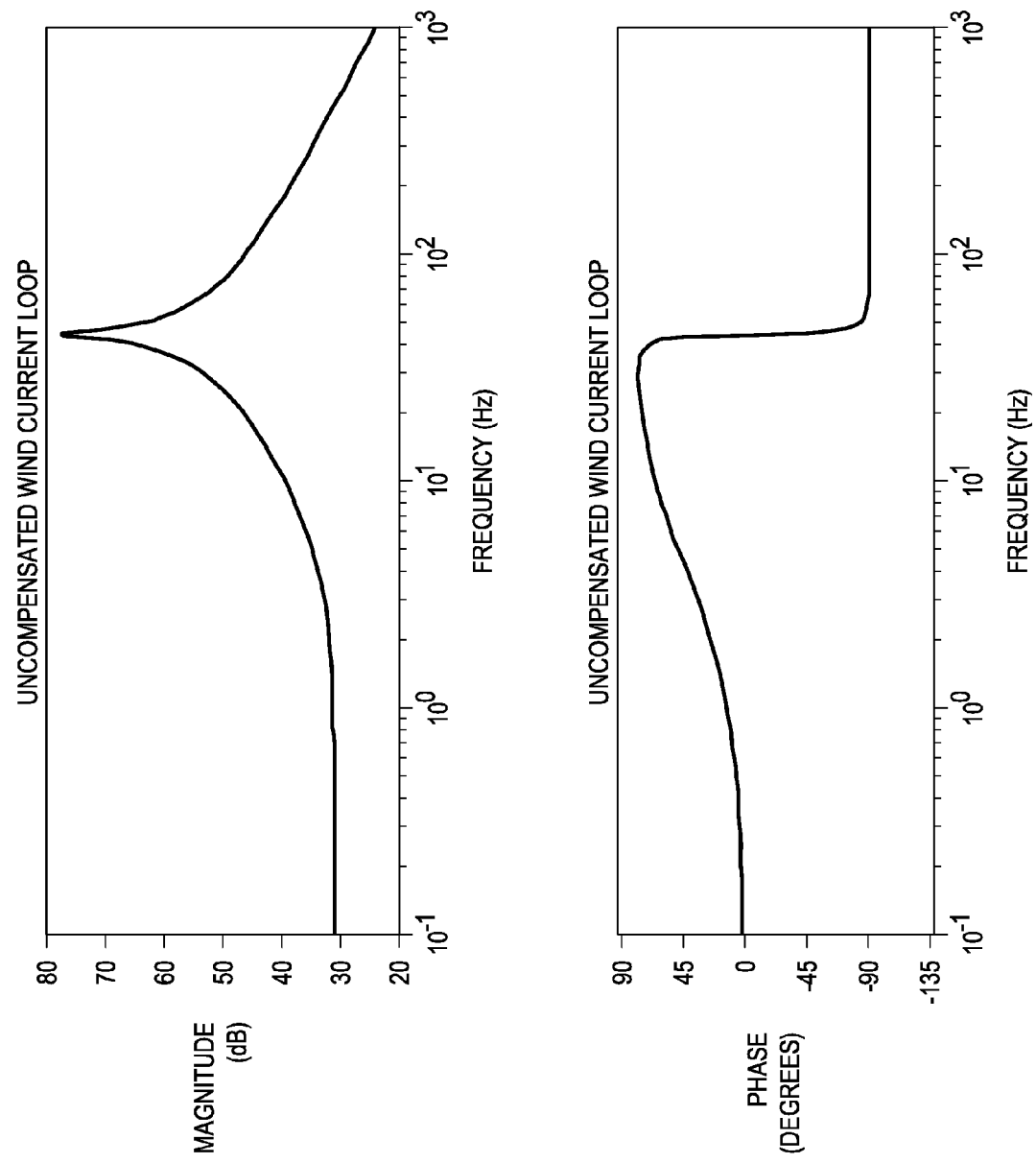
Figure 15B:
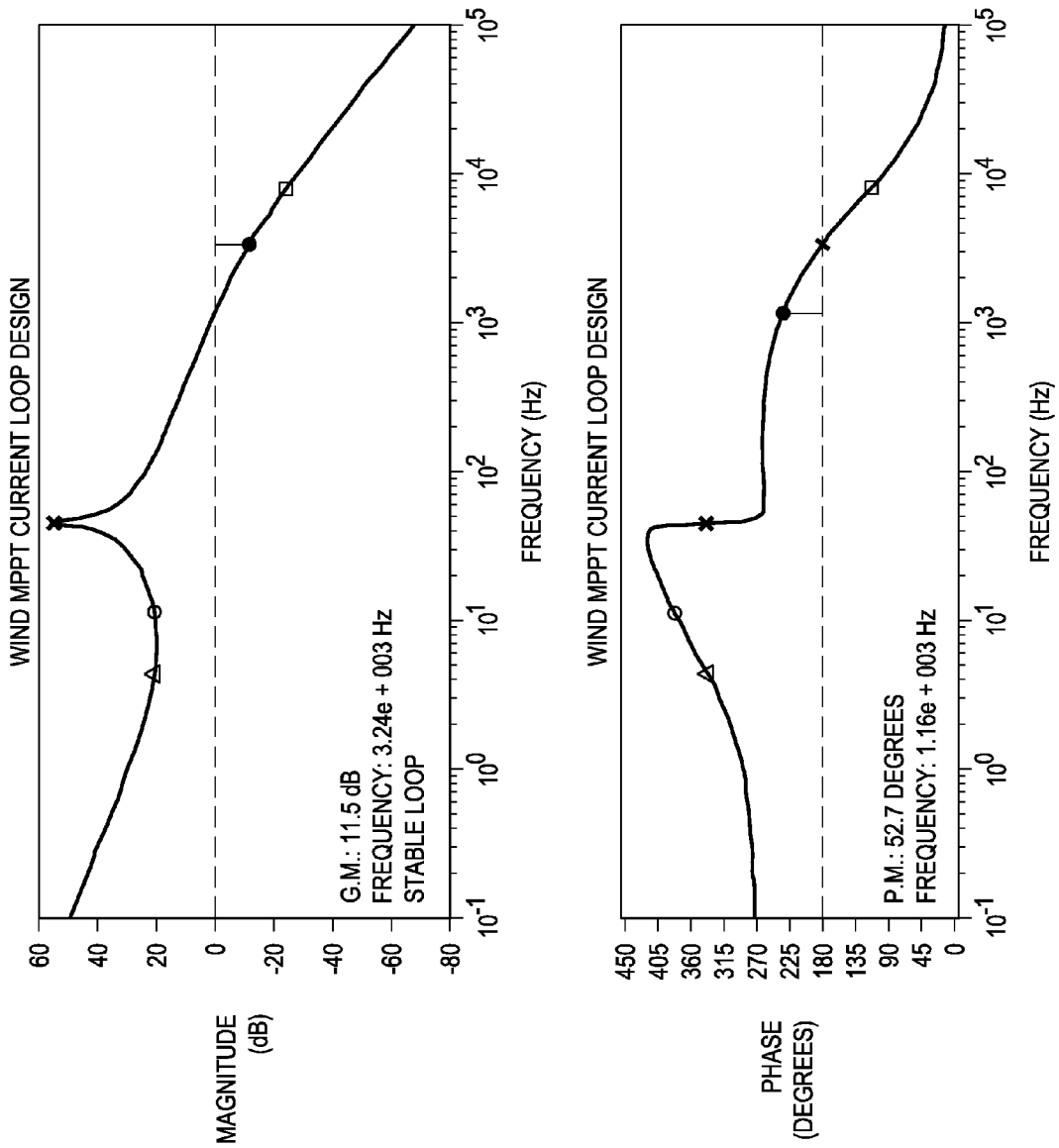

The DC-link is selected as 100-120 volt considering the step-up ratio of the boost switching cells. Under single-input operation, the control system block diagram in FIG. 10 can be simplified as shown in FIG. 11. The current open-loop gain and voltage open-loop gain is given in equation (5) and equation (6), respectively. The sample-and-hold in digital control system is modeled with zero-order-hold block in s-domain.

$$T_i(s) = C_i(s) \cdot FM \cdot G_{id}(s) \cdot H_i(s) \cdot ZOH \quad (5)$$

$$T_v(s) = C_v(s) \cdot G_v(s) \cdot H_v(s) \quad (6)$$

The frequency responses of the uncompensated and the proportional and integral (PI) controller compensated open-loop transfer function for the inner current loop are shown in FIGS. 12(a)-12(b), 13(a)-13(b), 14(a)-14(b), and 15(a)-15(b). As indicated in Table III, the current loop cross-over frequency of fuel cell switching cell is set at 633 Hz, which offers more than half a decade separation from the 120 Hz ripple frequency. The cross-over for battery, solar, and wind switching cells are selected relatively higher than the fuel cell channel. However, they still maintain a reasonable gain and phase margin respectively. The detailed gain and phase margin for each current control loop is listed in Table III.

TABLE III

Current-Loop Performance

| Current Loop | Gain Margin | Phase Margin | Cross-over Frequency |
|---|---|---|---|
| Battery | 12.8 dB | 56.5° | 1.01 kHz |
| Fuel Cell | 17.1 dB | 67.6° | 633 Hz |
| Solar | 12.2 dB | 55.1° | 1.07 kHz |
| Wind | 11.5 dB | 52.7° | 1.16 kHz |

Figure 16A:
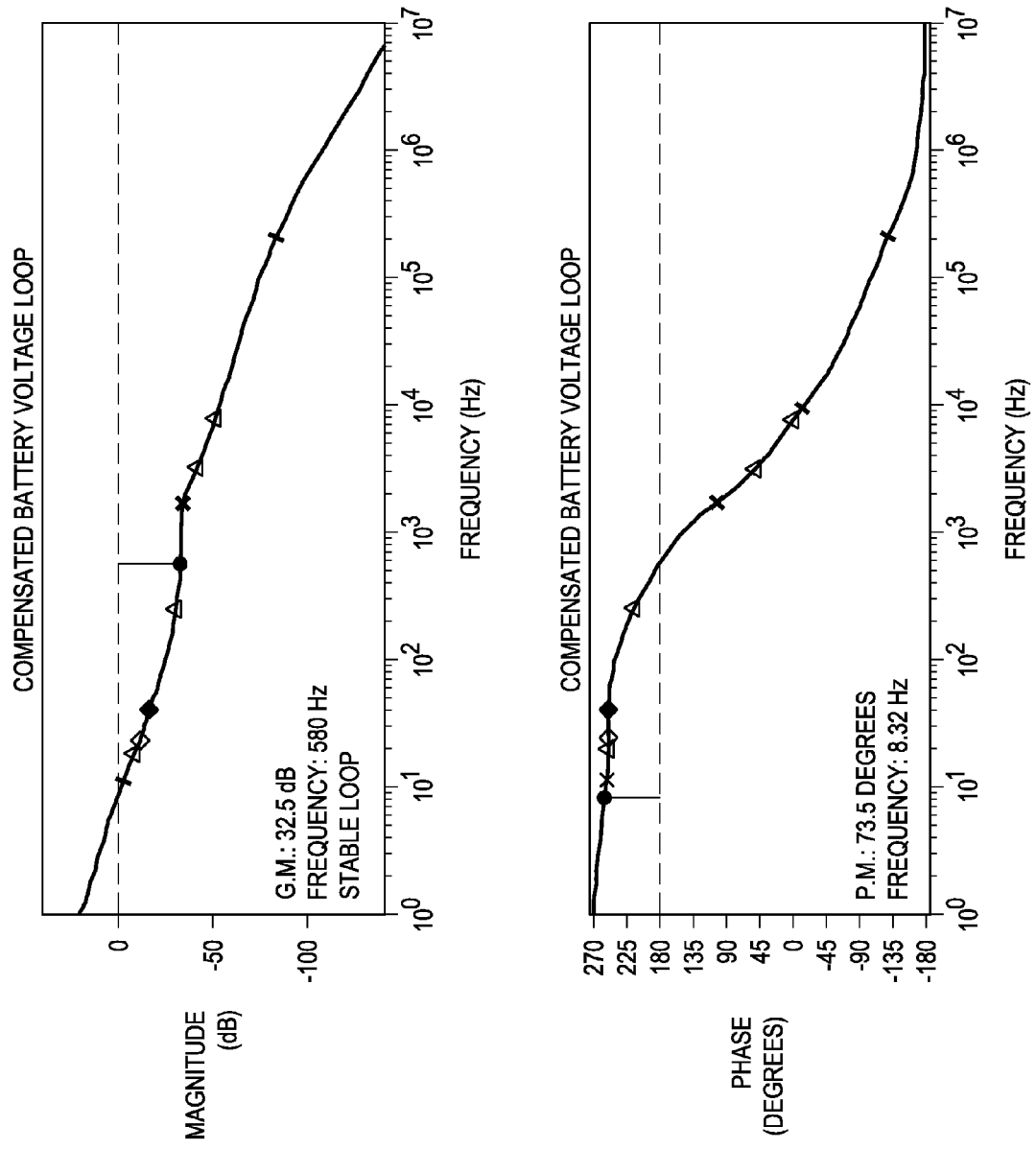
FIGS. 16(a) and (b) are graphs showing the compensated voltage loops for the battery and fuel cell, in accordance with some embodiments.
Figure 16B:
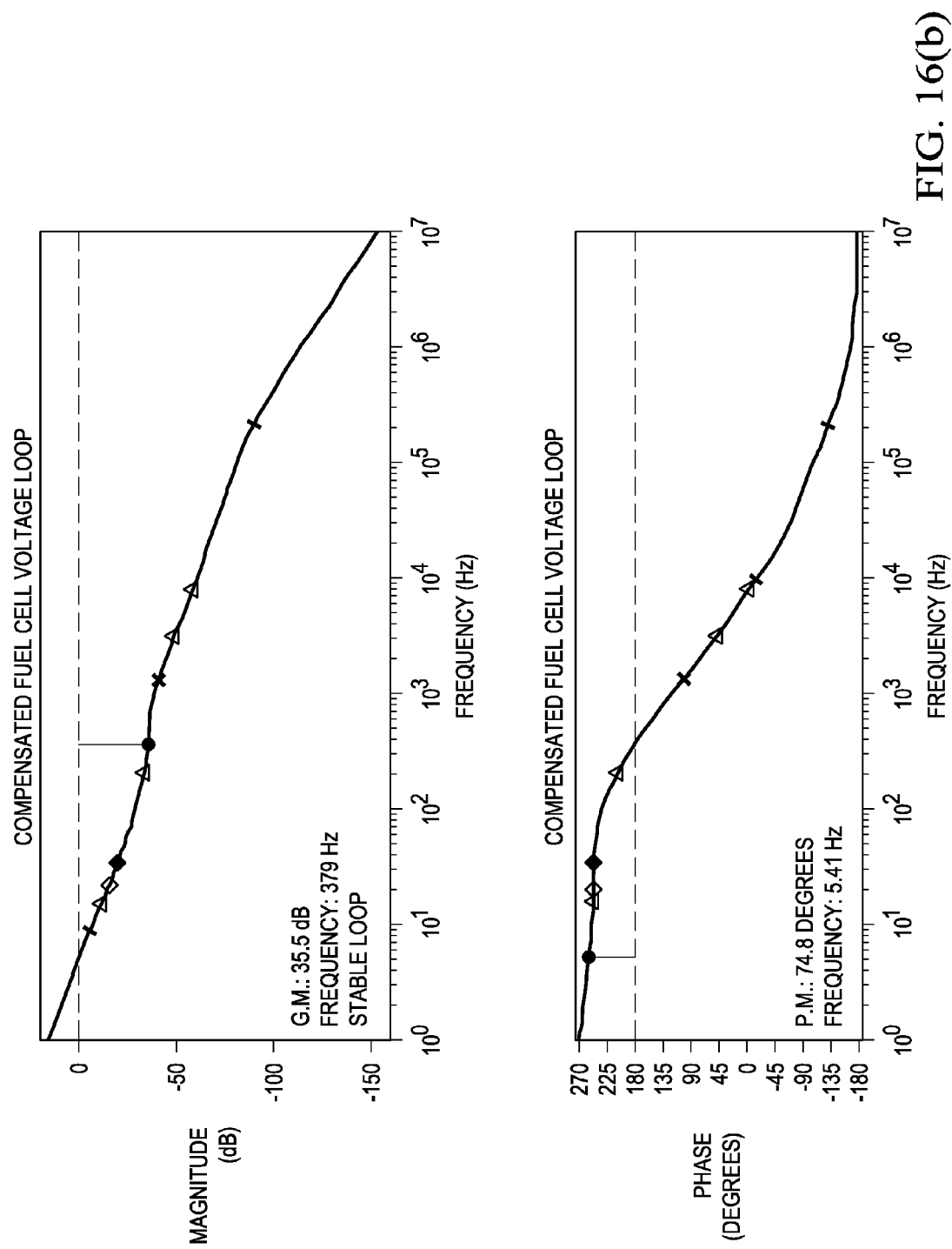

In single-input port operation, the fuel cell and the battery can support DC-link voltage individually. By equalizing the compensated inner current loop as a transfer function block $G_v(s)$, the open-loop transfer function of voltage loop is found as in equation (6). To avoid the 120 Hz ripple injection from the DC-link side, the voltage loop cross-over is selected lower than 24 Hz. In order to attenuate undesired disturbances, the cross-frequency of the battery voltage loop is selected as 8.32 Hz and as 5.41 Hz for the fuel cell voltage loop, which are plotted in FIGS. 16(a) and 16(b), respectively. The phase/gain margin of 74°/33 dB and 75°/35 dB can be achieved for the battery voltage drop and the fuel cell voltage loop, respectively.

In the case of multiple-source operation, the MPEI is organized as a cascade-parallel structure, as shown in FIG. 10. Since only one voltage controller is proposed in the entire control structure, the duty cycle perturbations ($\tilde{d}_x$) generated by different current loops must be evaluated and compensated for DC-link voltage stabilization. According to FIG. 10, the voltage open-loop gain under four-port input is derived in equation (7). The "supernode" transfer function $P_v(s)$ is indicated in equation (8), in which battery channel with control variable $\tilde{d}_i$ is used to support DC-link voltage (the $1^{st}$ row is selected in voltage loop design). $C_{ix}(s)$ and $T_{ix}(s)$ are the current controller and the current open-loop gain for the $i^{th}$ port, respectively.

$$T_v(s) = C_v(s) \cdot P_v(s) \cdot H_v(s) \quad (7)$$

where $$P_v(s) = \frac{\sum_{i=1}^{4} L_i \cdot G_{li} \cdot \psi_{1i}}{\alpha_1} \quad (8)$$

and $$G_{Ix} = \frac{C_{ix}(s) \cdot ZOH \cdot FM}{1 + T_{ix}(s)}, x = 1, 2, 3, 4. \quad (9)$$

Figure 17A:
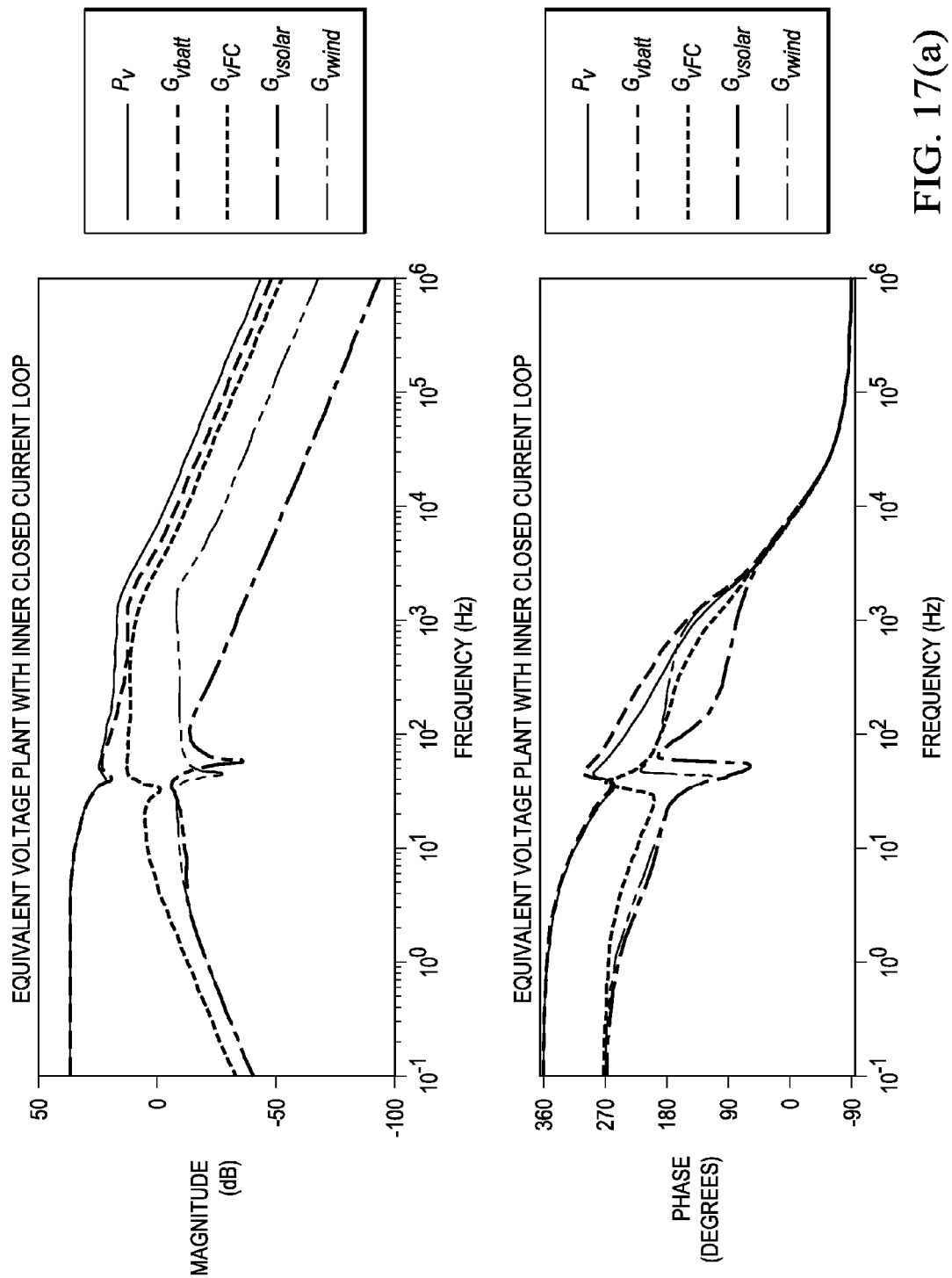
FIGS. 17(a) and (b) are graphs showing the frequency responses of the voltage loop controlled by the battery switching cell and the proportional and integral controller compensated voltage loop for the MPEI source interface, in accordance with some embodiments.
Figure 17B:
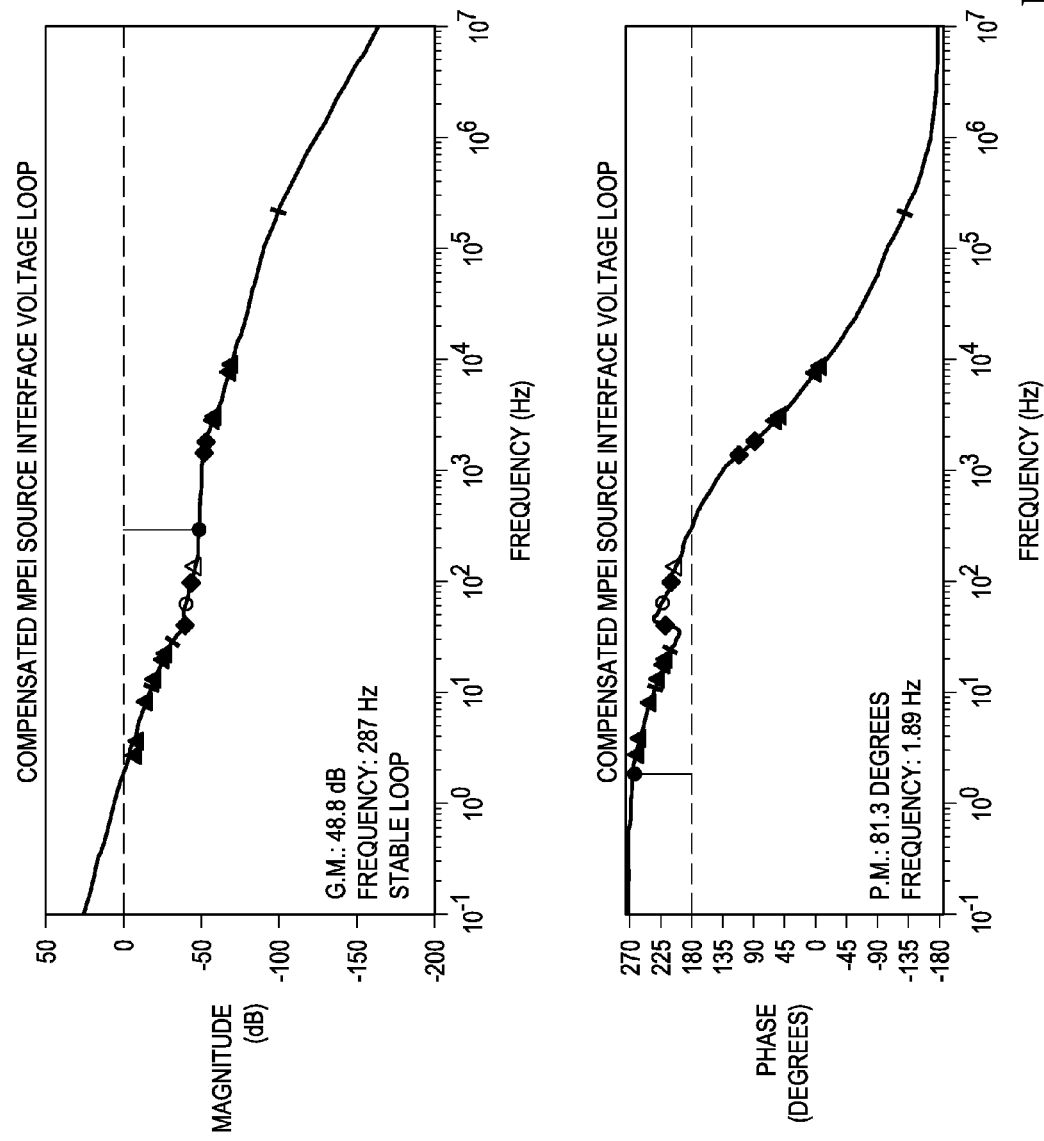

Under feedback controlled inner current loops, the frequency response of voltage loop (controlled by the battery switching cell) is shown in FIG. 17(a). Similar patterns of frequency response can be observed, in which disturbances from other switching cells only contribute to the modifications at higher frequencies. A classical PI controller is used to compensate the voltage loop. The cross-over frequency is chosen as 1.89 Hz for better immunization to noise. A gain margin of 48.8 dB and a phase margin of 81.3° of phase margin can be achieved, as is shown in FIG. 17(b).

Figure 18A:
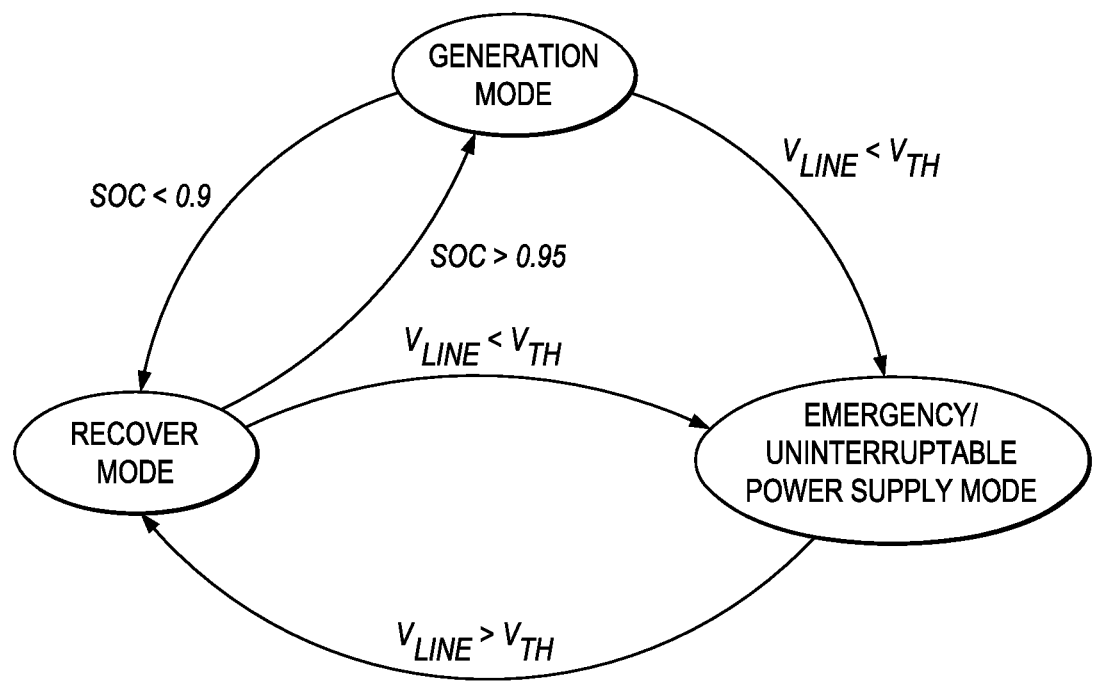
FIG. 18(a) is a block diagram showing the state machine of mode transitions, in accordance with some embodiments.

Taking the advantages of energy storage and controlled direction of power flow, the MPEI can harvest, store, and dispatch energy. Three modes of operation are defined for the MPEI to maintain sustainable work cycle: Generation Mode, Emergency/Uninterruptable Power Supply (UPS) Mode, and Recovery Mode, which is also called "Recover Mode" herein. Transitions between the modes are event-based. The state machine of mode transitions is shown in FIG. 18(a). Discrete events such as availability of renewable sources, state of charge (SOC) in battery or other energy storage, power demand at load-end, utility line status ($V_{LINE}$), and human input such as a preset threshold voltage ($V_{TH}$) are taken as inputs to the system controller. States of the system are monitored to provide feedback information to the local control loop as well as the local power management controller. Both discrete events and system states are used to make the operation mode transition decisions. With base power provider (fuel cell), renewable sources (wind and solar), energy storage (battery), and utility grid/island user, the MPEI operates in such a way that renewable sources are always optimally harvested and economically used. Base power is always available and the state of charge in energy storage is always above a safe level for emergency use. If $V_{LINE}$ falls below $V_{TH}$, the MPEI will operate in Emergency/UPS Mode. When $V_{LINE}$ is greater than $V_{TH}$, the MPEI will operate in either Generation Mode or Recover Mode depending on the SOC of the storage. In this embodiment, if the SOC<0.9, the MPEI will be in Recover Mode until SOC is greater than 0.95, at which point the MPEI will be in Generation Mode. The MPEI can be on-line all the time to provide sufficient power to the user and in doing so, generate zero emissions, which is a sustainable mode of operation.

FIG. 18(b) illustrates the operation of the MPEI in Generation Mode. The system is in Generation Mode, where the MPEI harvests available renewable energy and stores energy as well as supplies AC load, if there is no demand from the customer end and the storage is fully charged, greater than 95%. This is state S1 where the solar panel, wind turbine, and storage generate power to the grid. When the SOC of the storage is less than 90%, and the power from solar and wind is equal to zero, the system changes from state S1 to state S2 where energy is no longer sold to the utility grid.

FIG. 18(c) depicts operation of the MPEI in Recovery Mode. The system is in Recover Mode if no demand is found at the AC port, in which case renewable sources, with or without the utility grid, charge the storage based on the SOC of the storage. Multiple sources are used if recovery of energy storage is an immediate task. If the SOC of the storage is less than 50%, all local energy sources (fuel cell, solar, and wind) as well as the utility grid dispatch energy to the storage until the SOC reaches 90%. At this point, only energy from solar and wind is dispatched to the storage.

Figure 18D:
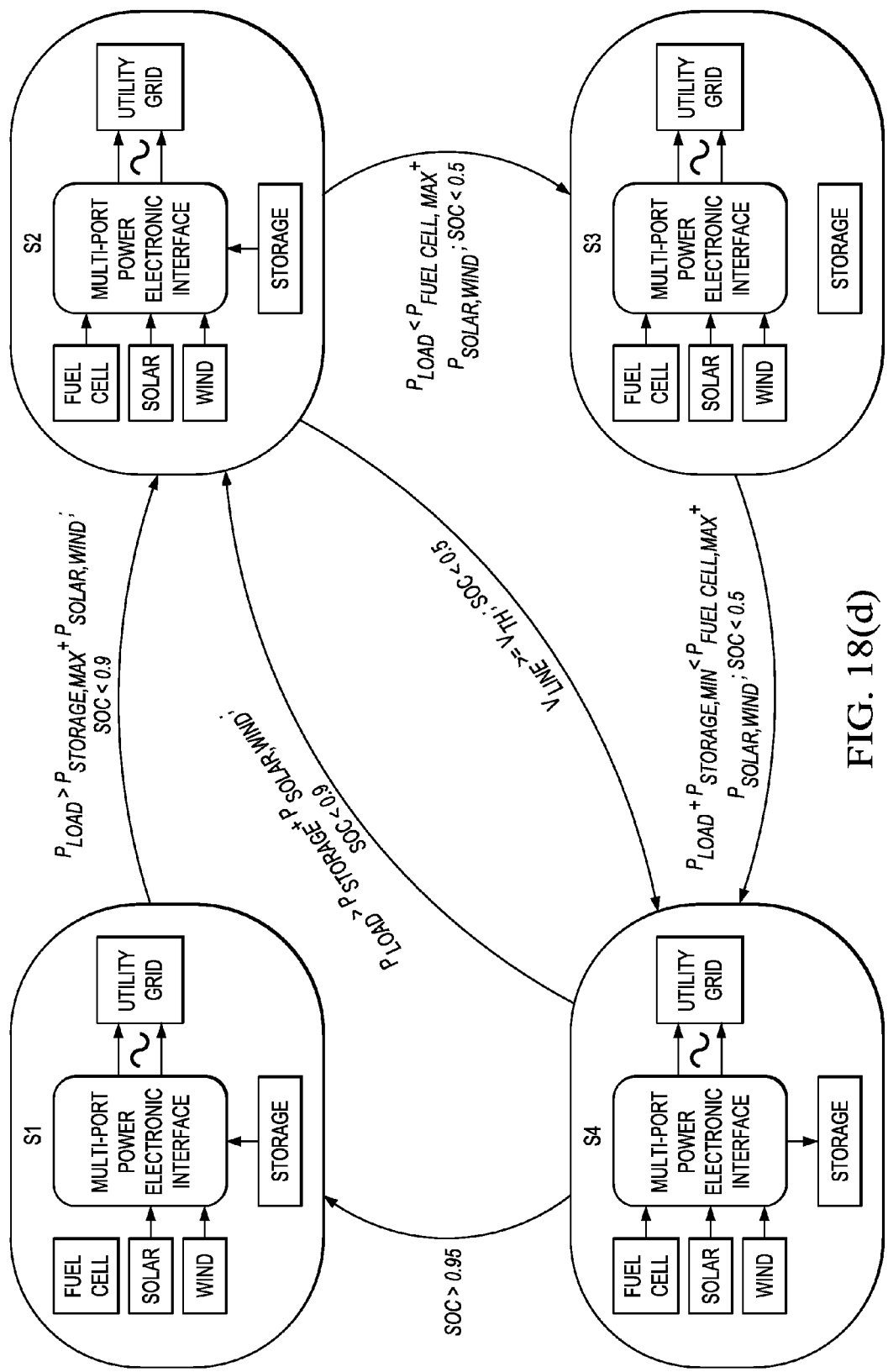
FIG. 18(d) is a block diagram illustrating the operation of the MPEI in Emergency/UPS Mode, in accordance with some embodiments.

FIG. 18(d) depicts operation of the MPEI in Emergency/UPS Mode. The system transitions from state S1 to state S2 when the SOC is less than 90% and the load power is greater than the maximum storage power plus the power from solar and wind. The system transitions from state S2 to state S3 if the SOC is less than 50% and the load power is less than the maximum fuel cell power plus the power from solar and wind. The system transitions from state S2 to state S4 if the line voltage is greater than or equal to the threshold voltage and the SOC is less than 50%. The system transitions from state S3 to state S4 if the SOC is less than 50% and the load power plus the minimum storage power is less than the maximum fuel cell power plus the power from solar and wind. The system transitions from state S4 to state S2 if the SOC is less than 90% and the load power is greater than the storage power plus the power from solar and wind. The system transitions from state S4 to state S1 if the SOC is greater than 95%.

Figure 19A:
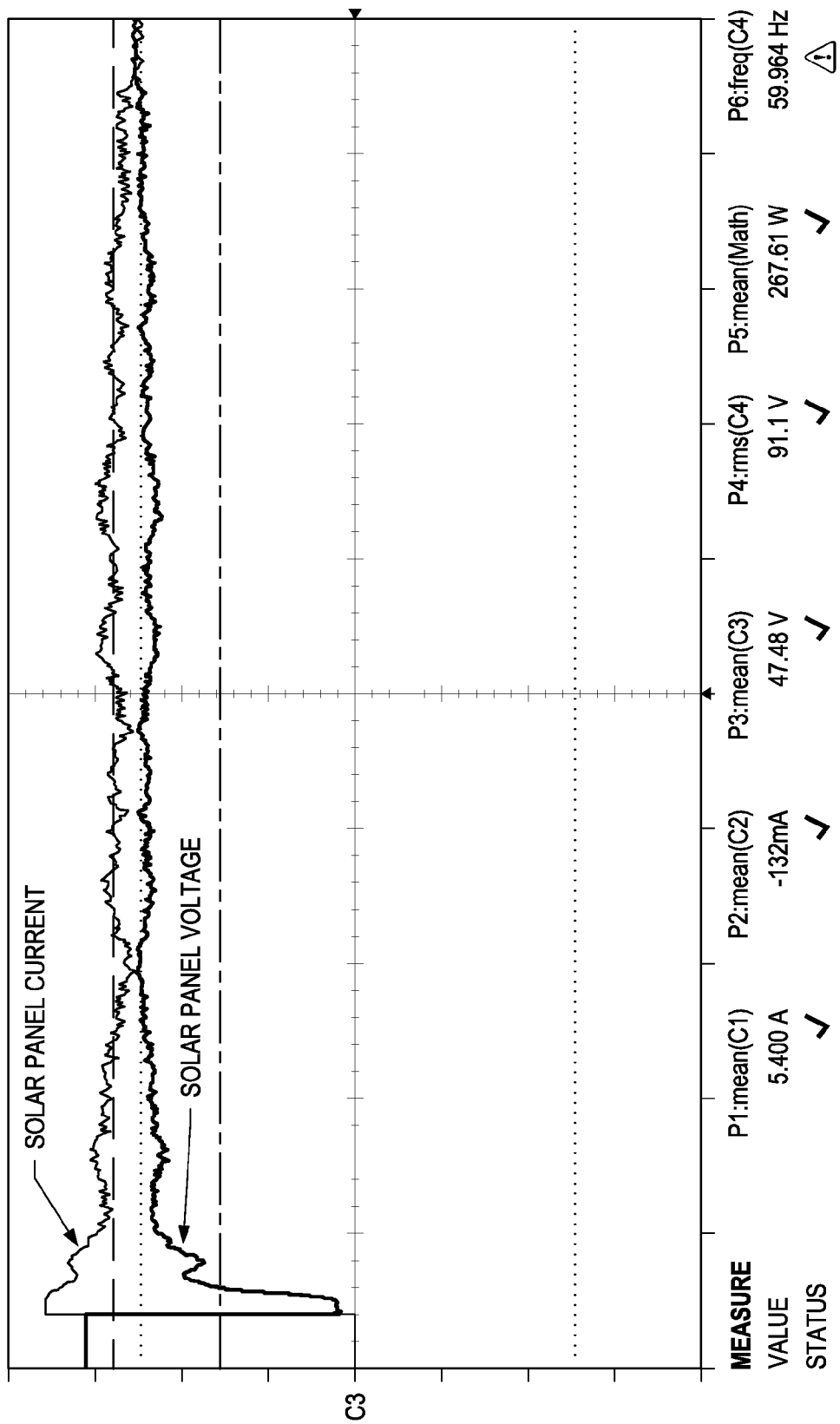
FIG. 19(a) is a graph illustrating the startup process of the solar switching cell, in accordance with some embodiments.
Figure 19B:
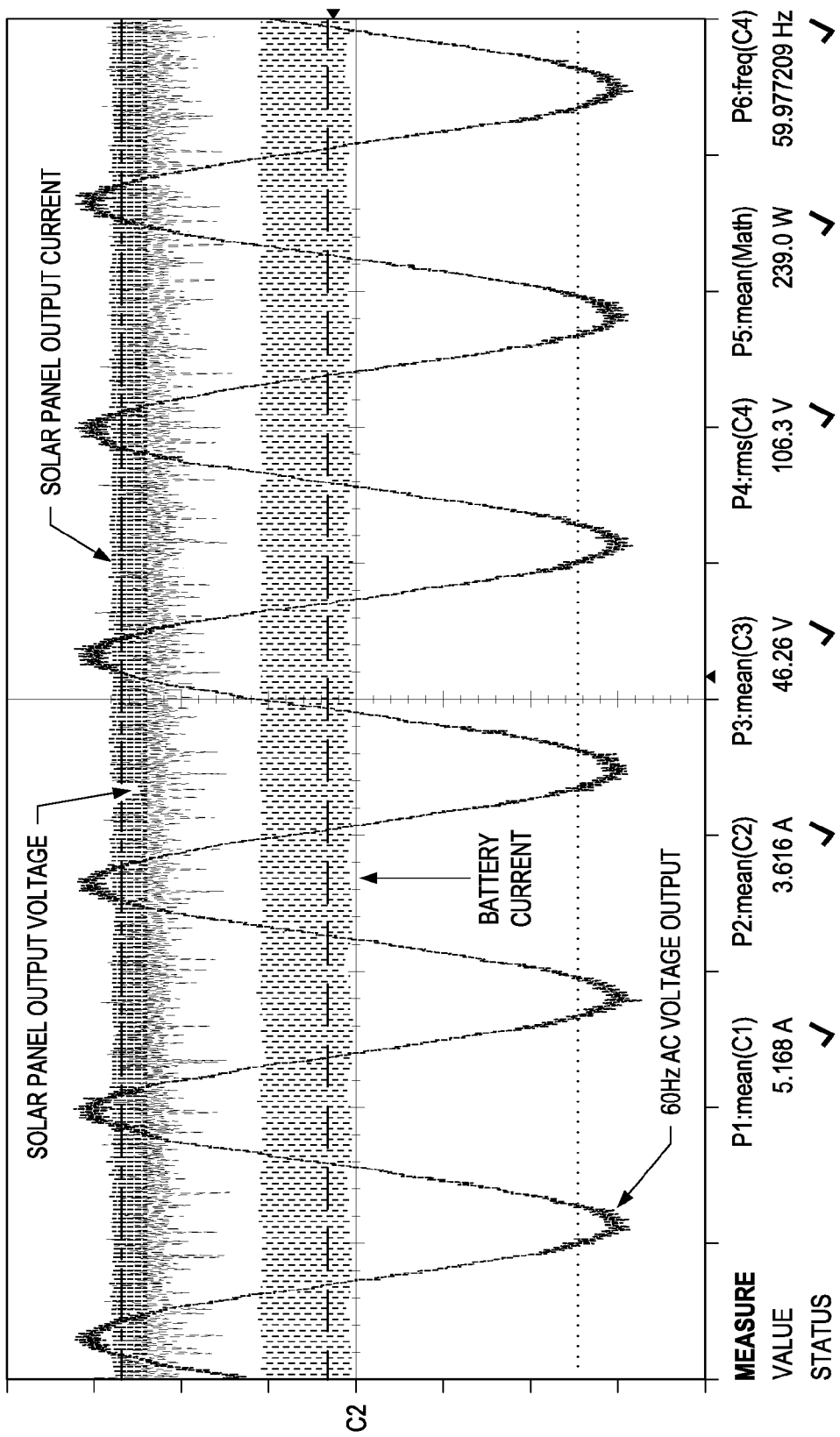
FIG. 19(b) is a graph showing the steady-state operation of the solar-battery co-generation where the MPEI supplies an island AC load, in accordance with some embodiments.

A five-port MPEI system interfaced to one Ballard Nexa fuel cell system, one lead acid battery pack, two series-connected solar panels, and one 48 V brushless DC wind turbine is experimentally tested at several meaningful system states of operation, in both transient and steady state, to demonstrate the CQCS method and load sharing performance. Under maximum power point tracking (MPPT), the solar current reference is updated in a timely basis synchronized with multiples of line frequency. The startup process of the solar switching cell is illustrated in FIG. 19(a), where the maximum power point is reached in ten seconds and the power harvested from solar is approximately equal to that of the calibrated solar panel output power under the same sun irradiation. In the load sharing operation, the solar panel is actively controlled to deliver maximum power to the inverter load while the remaining power-in-demand is provided by the energy storage (battery). FIG. 19(b) shows the steady-state operation of the solar-battery co-generation where the MPEI supplies an island AC load.

Figure 20A:
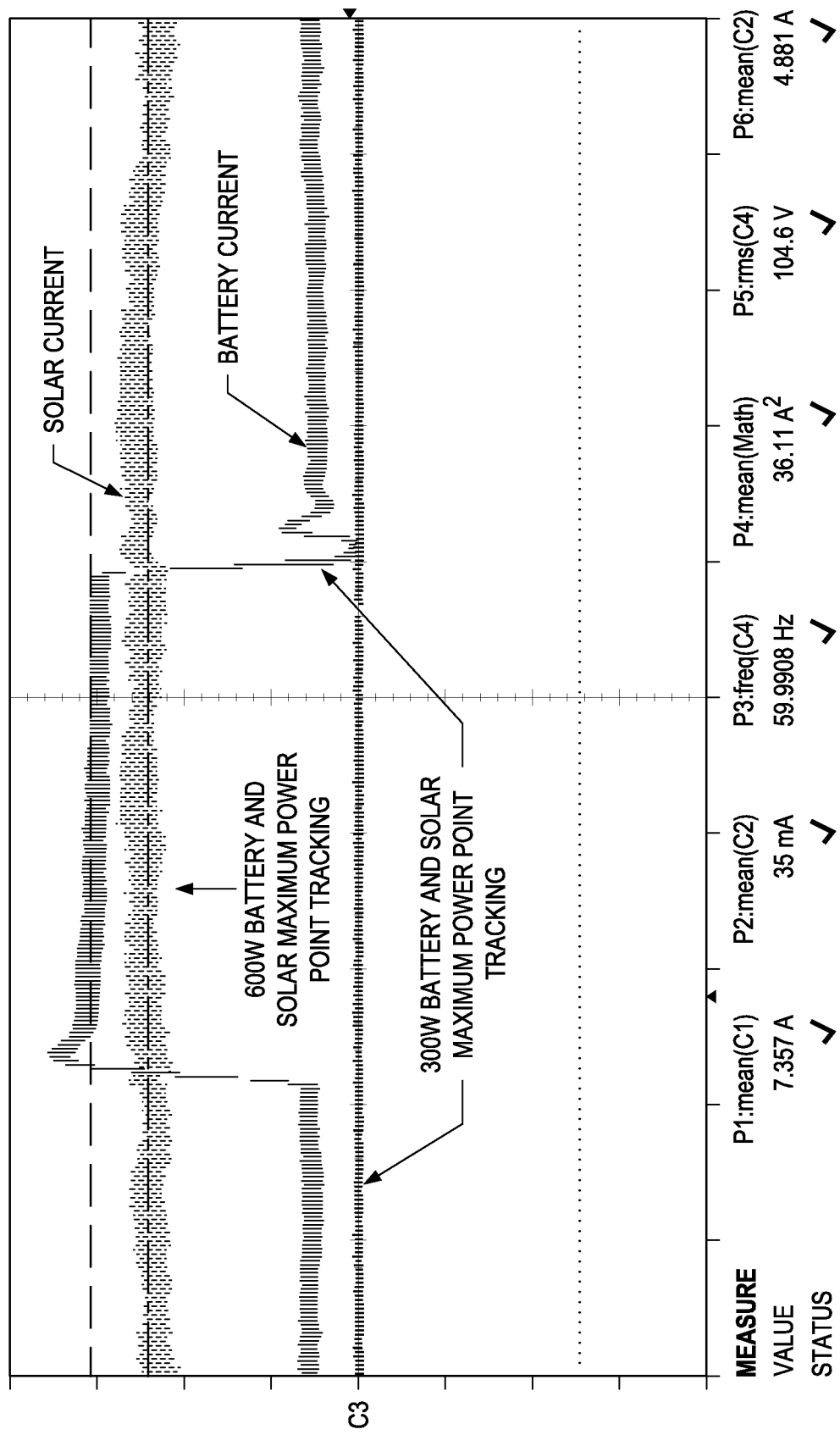
FIG. 20(a) is a graph showing the results of a pulse load test on the MPEI system, in accordance with some embodiments.
Figure 20B:
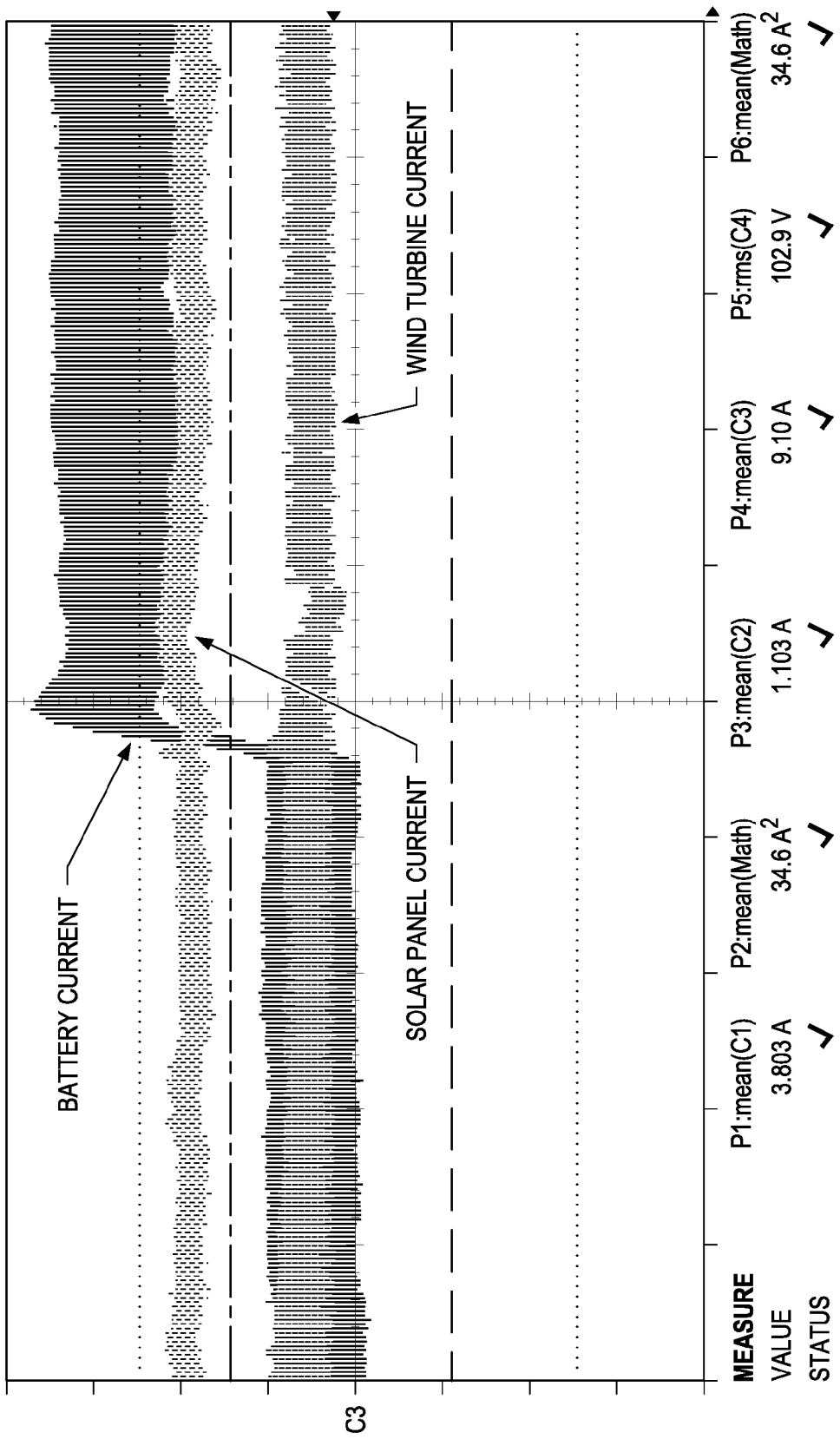
FIG. 20(b) is a graph showing the results of a step load test on the MPEI system, in accordance with some embodiments.

Since the power draw from solar and wind ports is under direct control during the load sharing process, the load dynamics are taken by the ACM controlled battery switching cell. FIG. 20(a) shows a pulse load test with solar-battery load sharing. The solar switching cell is working under MPPT while the battery switching cell stabilizes the DC-link voltage and dynamically shares the remaining power-in-demand. For the pulse load test, a 300 Watt pulse load is applied to the MPEI system and as can be observed from the FIG. 20(a), the MPPT operation (solar current) is not affected by the pulse load and the battery channel buffers the load dynamics by providing a pulse current. A step load test is illustrated in FIG. 20(b). The step load test is done with the wind turbine, the solar panel, and the battery working under load sharing. During a 300 Watt step load transient, the battery supplies the step load-in-demand while the MPPT of the solar and wind power are not affected.

Figure 21:
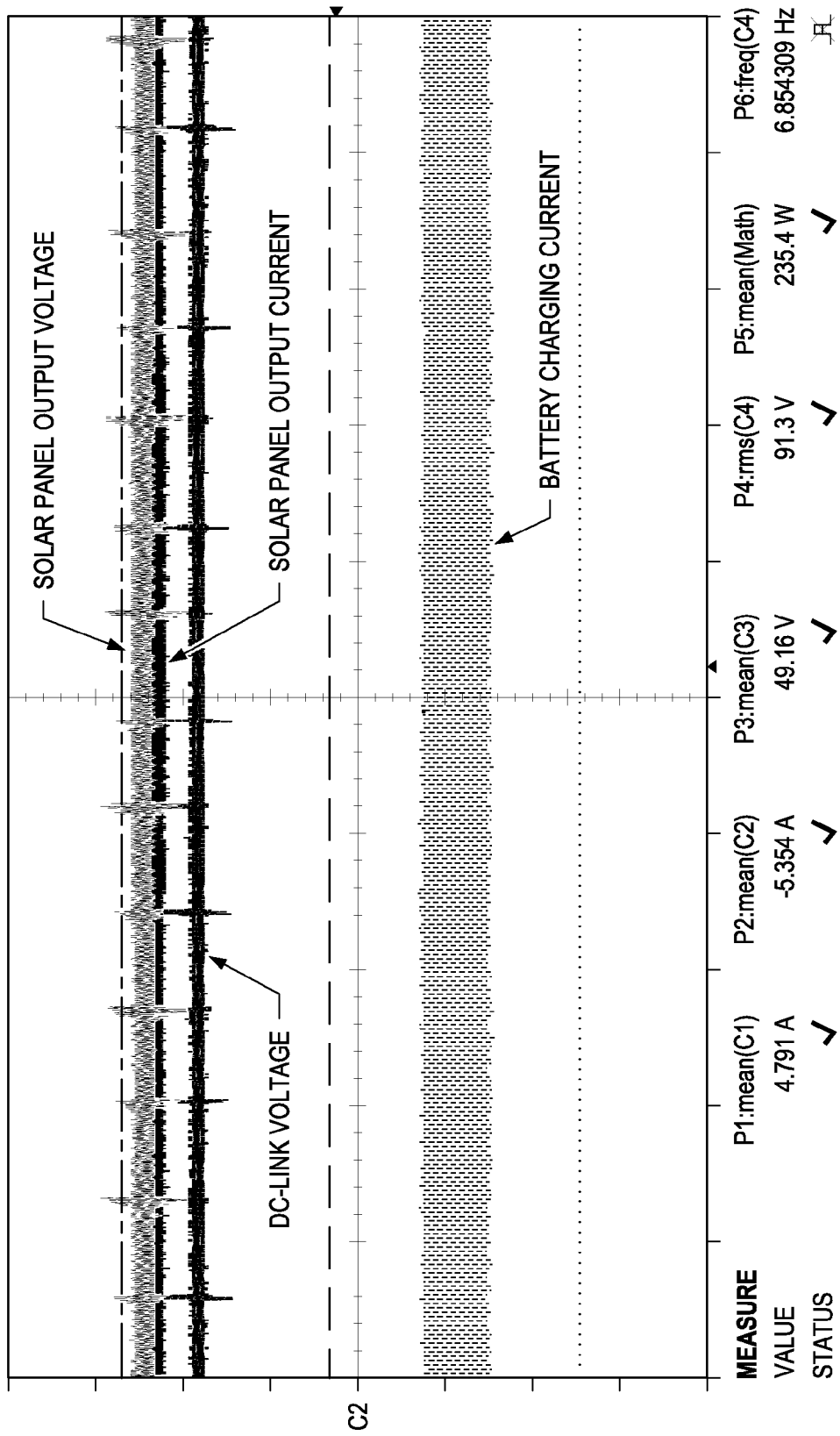
FIG. 21 is a graph illustrating the steady state maximum power transfer from solar to battery, in accordance with some embodiments.

In a solar-battery hybrid system, power maximization (maximum power transfer from solar to battery) is a desirable feature. This scenario can occur in Recovery Mode when only optimally harvested solar power is transferred to the battery pack. A current mode maximum power transfer (CMMPT) method is utilized to provide a dynamic relation between the battery charging current, the solar panel current, and the solar output power. The steady state maximum power transfer from solar to battery is illustrated in FIG. 21.

Figure 22:
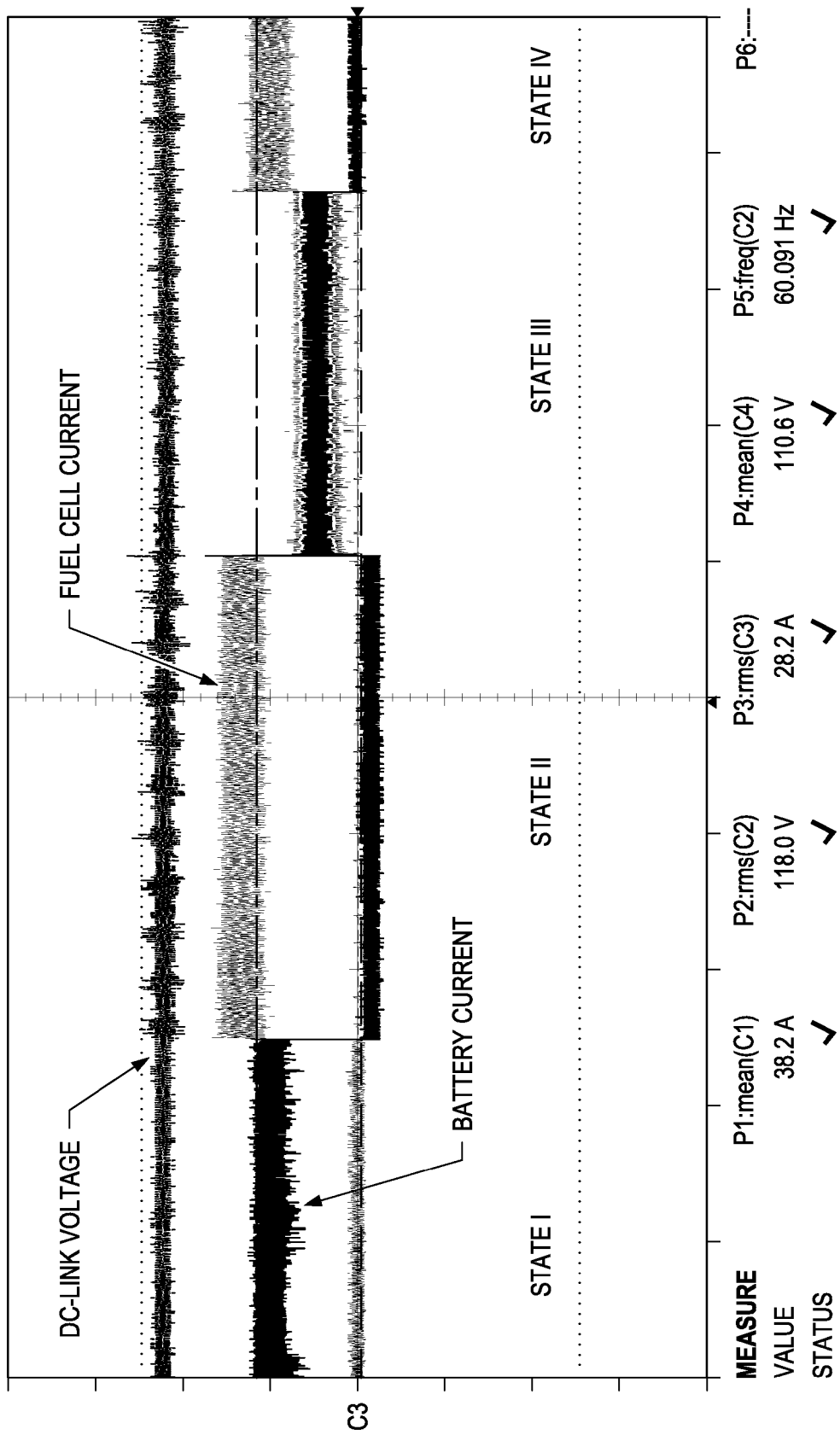
FIG. 22 is a graph showing the Emergency Mode of operation of an MPEI based on a fuel cell-battery hybrid system, in accordance with some embodiments.

The MPEI operates in Emergency Mode if the utility line voltage collapses, i.e. $V_{LINE} < V_{TH}$. An Emergency Mode of operation based on a fuel cell-battery hybrid system is shown in FIG. 22. Four states are associated with the operation of the MPEI in Emergency Mode. In State I, the battery channel is supplying the full 50 amp load at the beginning while the fuel cell is warming-up with little current draw. In State II, the fuel cell is working to supply nominal load and charging the battery with eight amps of current. In the power peaking State III, the fuel cell and the battery share the power to the load. In State III, the control vector $\vec{L}$ is equal to [1,1], thus evenly sharing the current between the fuel cell and the battery. In State IV during constant load demand, the fuel cell has to supply the load all alone without the battery because the battery SOC is too low. As shown in the waveform of FIG. 22, all four states are fully functional with nominal load at steady state and smooth transitions between the operation modes.

Figure 23A:
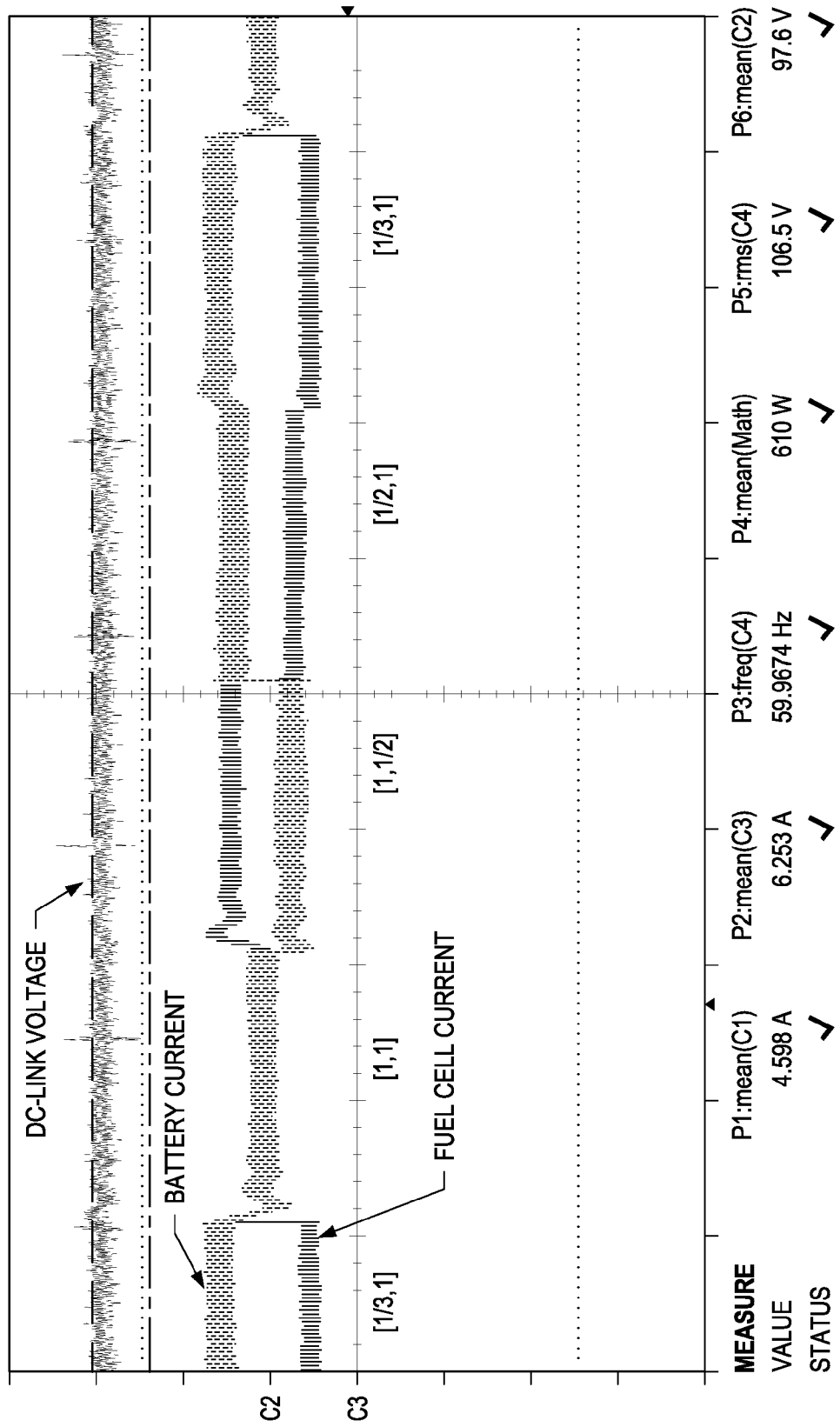
FIG. 23(a) is a graph illustrating the steady state load sharing, in accordance with some embodiments.
Figure 23B:
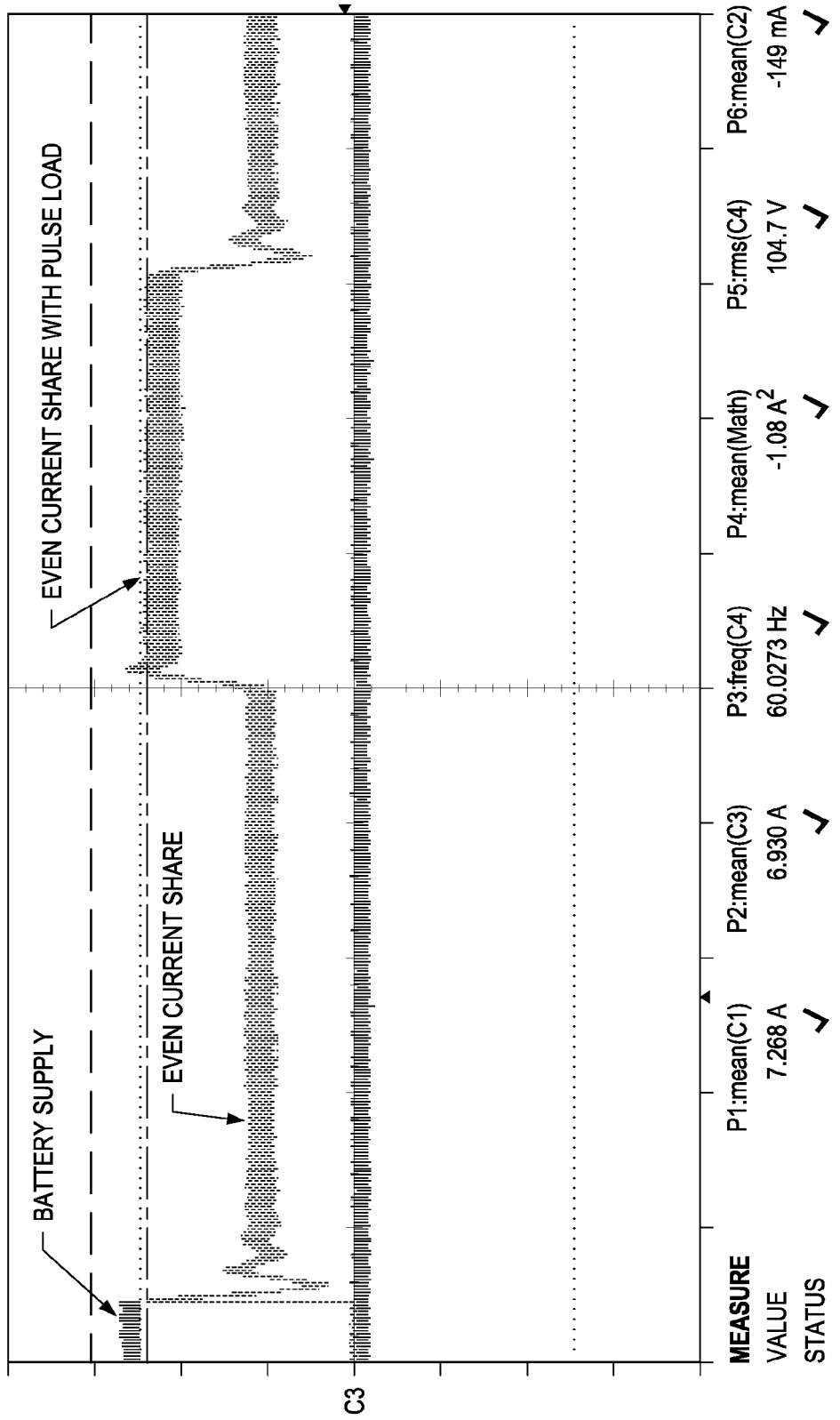
FIG. 23(b) is a graph showing a transient test of Controlled Quasi Current Source, in accordance with some embodiments.
Figure 23C:
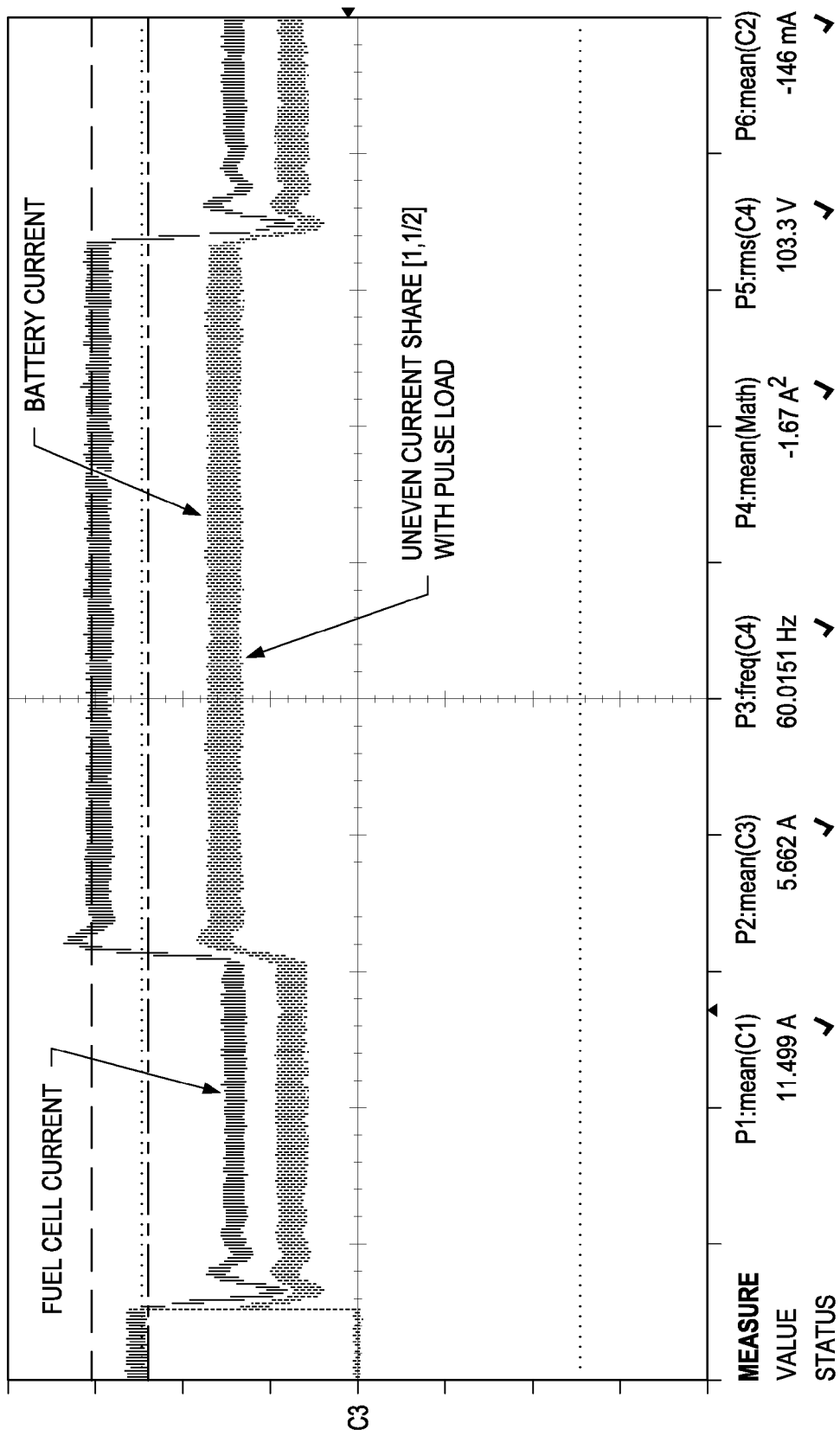
FIG. 23(c) is a graph showing the steady state load sharing for a fuel cell-battery hybrid system where the battery is at low state-of-charge, in accordance with some embodiments.

To test the performance of CQCS, an MPEI using the fuel cell and the battery as the main power sources to supply the load interface is used. By adjusting the control vector $\vec{L}$, the steady state as well as the dynamics of the inner current reference are altered proportionally. FIG. 23(a) illustrates the steady state load sharing with the updated control vectors $\vec{L}$ of [⅓,1], [1,1], [1,½], [½,1], and [⅓,1], where the fuel cell is configured to share ¼, ½, ⅔, ⅓, and ¼ of the entire current respectively from the left to the right side of the chart. The transient test of CQCS is shown in FIG. 23(b). In this test, the control vector $\vec{L}$ is set to [1,1] which renders even current sharing between the fuel cell and the battery. Upon the presence of a pulse load, the fuel cell and the battery current respond to the load dynamics by providing the same step of currents. However, in most scenarios, due to the usage of renewable sources and energy storages, constraints will apply during the system operation, such as the cold start of the fuel cell and the low state-of-charge in the battery. Reconfiguring the control vector can properly solve this problem and operate each source at its sub-optimal state. FIG. 23(c) shows the scenario when the battery is at low state-of-charge and the control vector is configured as [1, ½]. The steady state operation can be observed in the second and forth segments from the left of FIG. 23(c) in which the battery only shares ⅓ of the entire input current and is protected from over-discharging. During a pulse load transient, the load dynamics is split between the fuel cell and the battery source. As expected, the battery also shares ⅓ of the current-in-demand during the pulse load period.

In light of the principles and example embodiments described and illustrated herein, it will be recognized that the example embodiments can be modified in arrangement and detail without departing from such principles. Also, the foregoing discussion has focused on particular embodiments, but other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, and processes in which the individual operations disclosed herein are combined, subdivided, rearranged, or otherwise altered.

This disclosure also described various benefits and advantages that may be provided by various embodiments. One, some, all, or different benefits or advantages may be provided by different embodiments.

In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims, and all equivalents to such implementations.

What is claimed is:

1. An energy management system, comprising:
a first port configured for bidirectional flow of energy and connected to an energy storage device;
a second port configured for unidirectional flow of energy and connected to an energy source device;
a third port configured for bidirectional flow of energy and connected to a utility grid; and
a unified control system wherein the unified control system comprises control logic configured to operate in a generation mode, a recovery mode, and an emergency/UPS mode and operable to simultaneously control energy flow between the first, second, and third ports based on at least two factors from a group consisting of:
a state of charge of the energy storage device,
a state of the energy source device, and
a state of the utility grid, and
wherein the emergency/UPS mode comprises energy transfer from the energy source device and the energy storage device to a power load or the utility grid when the state of charge of the energy storage device is less than 90% and a load power demand is greater than a maximum state of charge of the energy storage device plus the state of the energy source device.

2. The energy management system of claim 1, further comprising:
an intelligent energy management system wherein the intelligent energy management system comprises control logic operable to purchase, sell, store, or schedule energy between the first, second, and third ports based on at least one factor from the group consisting of:
a renewable energy generation forecast,
an energy consumption forecast, and
a substantially real-time price of energy.

3. The energy management system of claim 2, wherein the renewable energy generation forecast is based on a weather forecast.

4. The energy management system of claim 2, wherein the energy consumption forecast is based on a weather forecast and past energy consumption data.

5. The energy management system of claim 1, wherein the energy source device comprises at least one device from the group consisting of: a photovoltaic device, a fuel cell, a wind turbine, a vibration energy harvester, and a nuclear device.

6. The energy management system of claim 1, wherein the energy storage device comprises at least one device from the group consisting of: a battery, a hydraulic device, and an ultra capacitor.

7. The energy management system of claim 1, further comprising:
a DC source interface converter configured to process unidirectional energy flow from the energy source device and bidirectional energy flow from the energy storage device to support a stable DC-link; and
an AC load interface converter supplied by the stable DC-link; and
wherein the AC load interface is configured to process bidirectional energy flow from the utility grid.

8. The energy management system of claim 1, wherein the generation mode comprises energy transfer from the energy storage device and the energy source device to the utility grid when the state of charge of the energy storage device is greater than 95% and the state of the energy source device is greater than zero.

9. The energy management system of claim 1, wherein the recovery mode comprises energy transfer from the energy source device and the utility grid to the energy storage device when the state of charge of the energy storage device is less than 50%.

10. The energy management system of claim 1, wherein the emergency/UPS mode comprises energy transfer from the energy source device and the energy storage device to the utility grid when the state of charge of the energy storage device is greater than 95%.

11. The energy management system of claim 1, wherein the emergency/UPS mode comprises energy transfer only from the at least one energy source device to a power load or the utility grid when the state of charge of the energy storage device is less than 50% and the load power demand is less than the state of the energy source device.

12. An energy management system, comprising:
a first port configured for bidirectional flow of energy and connected to an energy storage device;
a second port configured for unidirectional flow of energy and connected to an energy source device;
a third port configured for bidirectional flow of energy and connected to a utility grid; and
a unified control system wherein the unified control system comprises control logic configured to operate in a generation mode, a recovery mode, and an emergency/UPS mode and operable to simultaneously control energy flow between the first, second, and third ports based on at least two factors from the group consisting of:
a state of charge of the energy storage device,
a state of the energy source device, and
a state of the utility grid, and
wherein the emergency/UPS mode comprises energy transfer from the energy source device to the energy storage device and a power load or the utility grid when the state of charge of the energy storage device is less than 50% and a load power demand plus a minimum state of charge of the energy storage device is less than the state of the energy source device.

13. A method for managing energy movement, the method comprising:
receiving, at a unified control system for a multi-port power interface operable to provide for energy flow between first, second, and third ports of the multi-port power interface, information pertaining to a state of charge of an energy storage device connected to the first port;
receiving, at the unified control system, information pertaining to a state of at least one energy source device connected to the second port;
receiving, at the unified control system, information pertaining to a state of a utility grid connected to the third port; and
automatically determining whether operational characteristics of the multi-port power interface should be modified, based on at least two factors from the group consisting of:
the information pertaining to the state of charge of the energy storage device;
the information pertaining to the state of the energy source device; and
the information pertaining to the state of the utility grid; and
in response to determining that operational characteristics of the multi-port power interface should be modified, automatically modifying the operational characteristics of the multi-port power interface accordingly, wherein the operation of automatically determining whether operational characteristics of the multi-port power interface should be modified comprises automatically selecting between at least three modes, comprising:

a recovery mode for purchasing energy from the utility grid;

a generation mode for selling energy to the utility grid; and an emergency mode, wherein the emergency mode is selected in response to determining that the state of charge of the energy storage device is less than 90% and a load power demand is greater than a maximum state of charge of the energy storage device plus the state of the energy source device;

wherein the unified control system comprises control logic configured to operate in the generation mode, the recovery mode, and the emergency mode.

14. The method of claim 13, wherein:
the operation of selecting between at least three modes comprises selecting the generation mode in response to determining that the state of charge of the energy storage device is greater than 95% and the state of the energy source device is greater than zero; and
the operation of automatically modifying the operational characteristics of the multi-port power interface accordingly comprises configuring the multi-port power interface to transfer energy from the energy storage device and the energy source device to the utility grid.

15. The method of claim 13, wherein:
the operation of selecting between at least three modes comprises selecting the recovery mode in response to determining that the state of charge of the energy storage device is less than 50%; and
the operation of automatically modifying the operational characteristics of the multi-port power interface accordingly comprises configuring the multi-port power interface to transfer energy from the energy source device and the utility grid to the energy storage device.

16. The method of claim 13, wherein the emergency mode is selected in response to determining that the state of charge of the energy storage device is greater than 95%; and
the operation of automatically modifying the operational characteristics of the multi-port power interface accordingly comprises configuring the multi-port power interface to transfer energy from the energy source device and the energy storage device to a power load or the utility grid.

17. The method of claim 13, wherein:
the operation of automatically modifying the operational characteristics of the multi-port power interface accordingly comprises configuring the multi-port power interface to transfer energy from the energy source device and the energy storage device to a power load.

18. The method of claim 13, wherein the emergency mode is selected in response to determining that the state of charge of the energy storage device is less than 50% and a load power demand is less than the state of the energy source device; and
the operation of automatically modifying the operational characteristics of the multi-port power interface accordingly comprises configuring the multi-port power interface to transfer energy only from the at least one energy source device to a power load or the utility grid.

19. The method of claim 13, wherein the emergency mode is selected in response to determining that the state of charge of the energy storage device is less than 50% and a load power demand plus a minimum state of charge of the energy storage device is less than the state of the energy source device; and
the operation of automatically modifying the operational characteristics of the multi-port power interface accordingly comprises configuring the multi-port power interface to transfer energy from the energy source device to the energy storage device and a power load or the utility grid.

20. The method of claim 13, wherein the determination of whether operational characteristics of the multi-port power interface should be modified is further based on at least one factor from the group consisting of:
a renewable energy generation forecast,
an energy consumption forecast, and
a substantially real-time price of energy.

21. The method of claim 20, wherein the renewable energy generation forecast is based on a weather forecast.

22. The method of claim 20, wherein the energy consumption forecast is based on a weather forecast and past energy consumption data.

23. The method of claim 13, wherein the energy source device comprises at least one device from the group consisting of: a photovoltaic device, a fuel cell, a wind turbine, a vibration energy harvester, and a nuclear device.

24. The method of claim 13, wherein the energy storage device comprises at least one device from the group consisting of: a battery, a hydraulic device, and an ultra capacitor.

25. The method of claim 13, further comprising:
configuring a DC source interface converter to process unidirectional energy flow from the energy source device and bidirectional energy flow from the energy storage device to support a stable DC-link; and
configuring an AC load interface converter supplied by the stable DC-link to process bidirectional energy flow from the utility grid.

\* \* \* \* \*